Dec. 18, 1928.　　　　　　　　　　　　　　　　　　1,695,762
F. O. HOAGLAND
BACKING-OFF DEVICE FOR CUTTERS HAVING ANGULARLY DISPOSED TEETH
Filed March 27, 1924　　　20 Sheets-Sheet 1

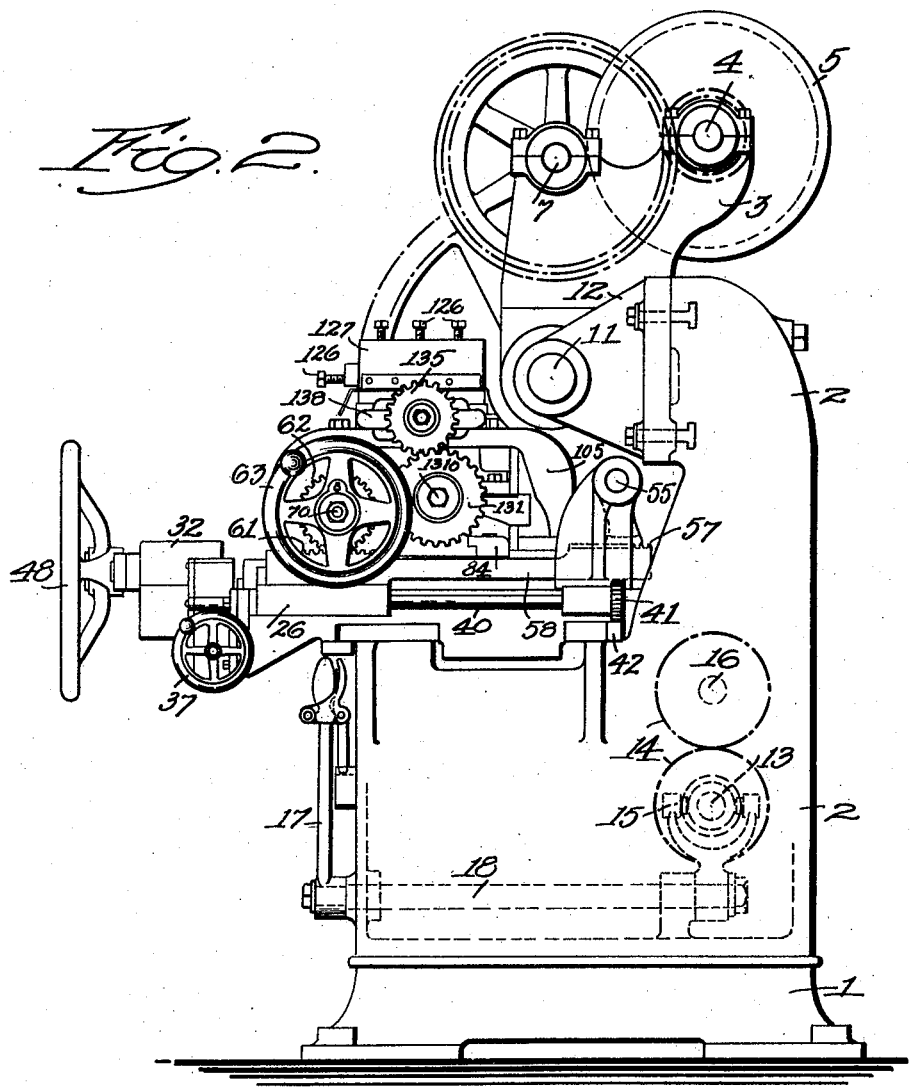

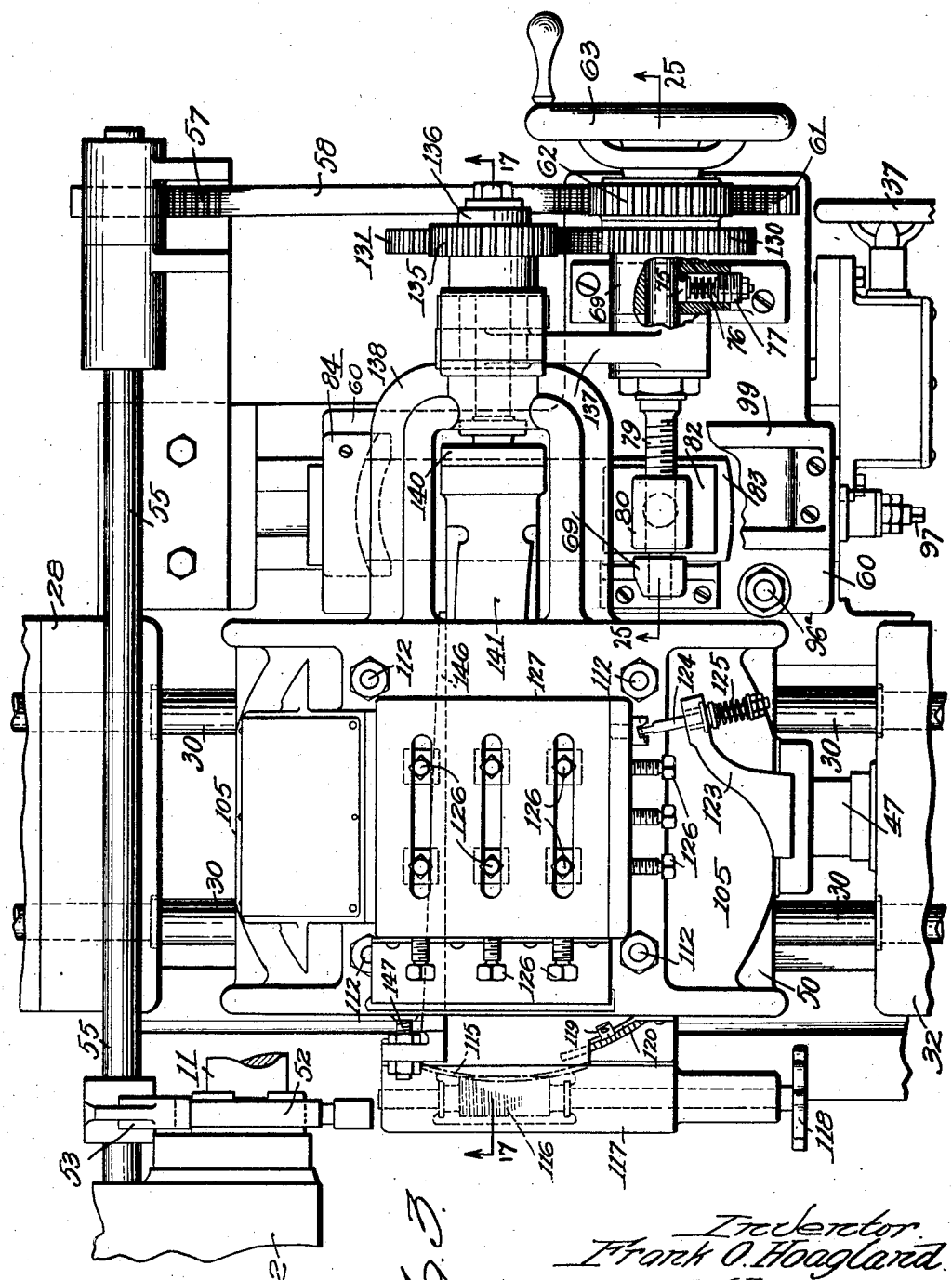

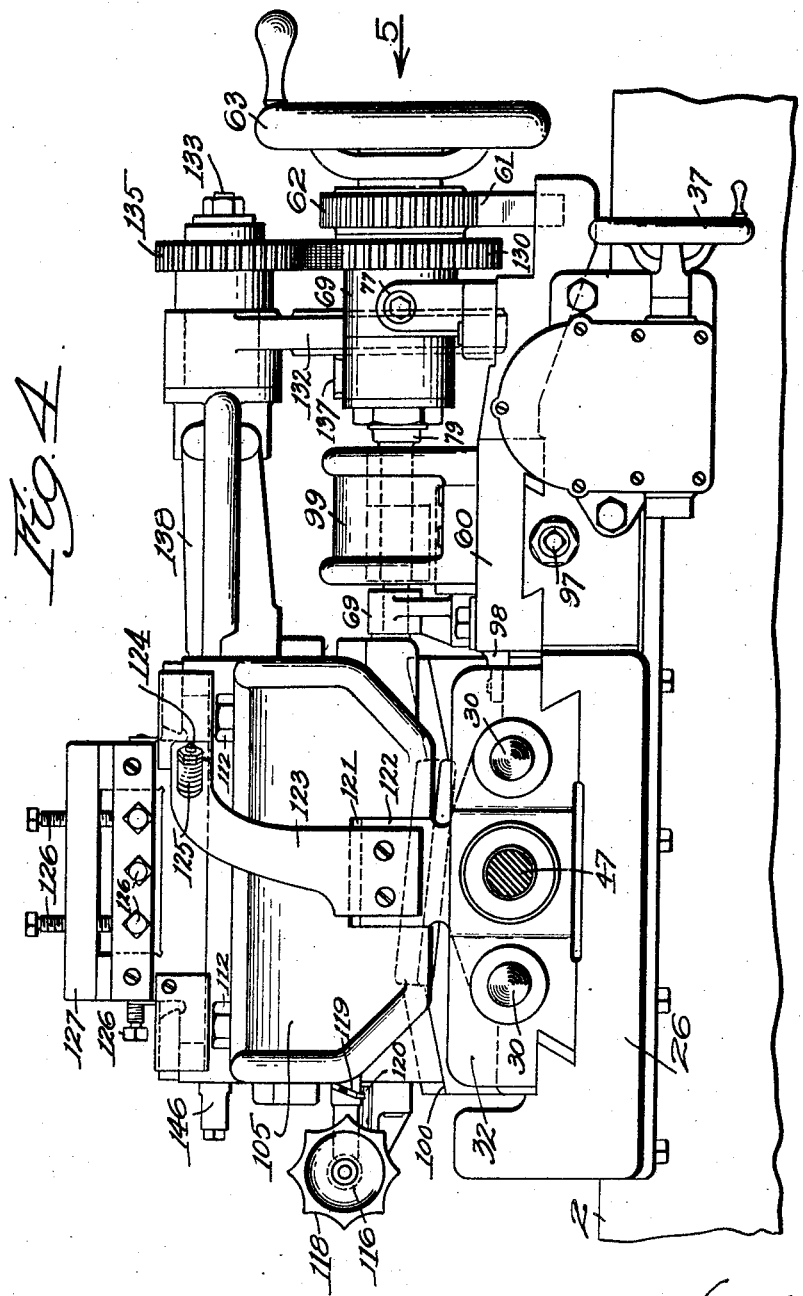

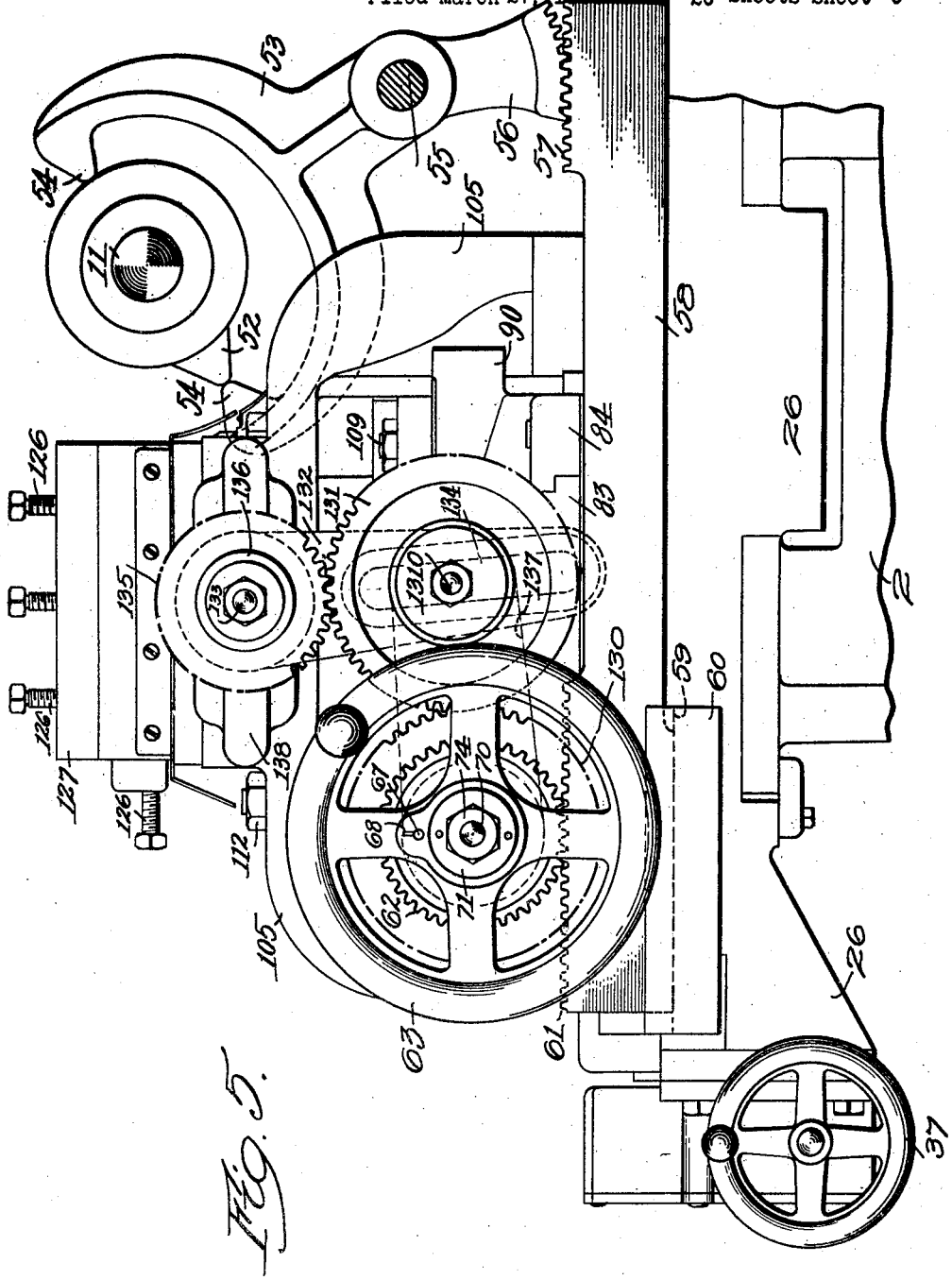

Dec. 18, 1928.
F. O. HOAGLAND
1,695,762
BACKING-OFF DEVICE FOR CUTTERS HAVING ANGULARLY DISPOSED TEETH
Filed March 27, 1924
20 Sheets-Sheet 6
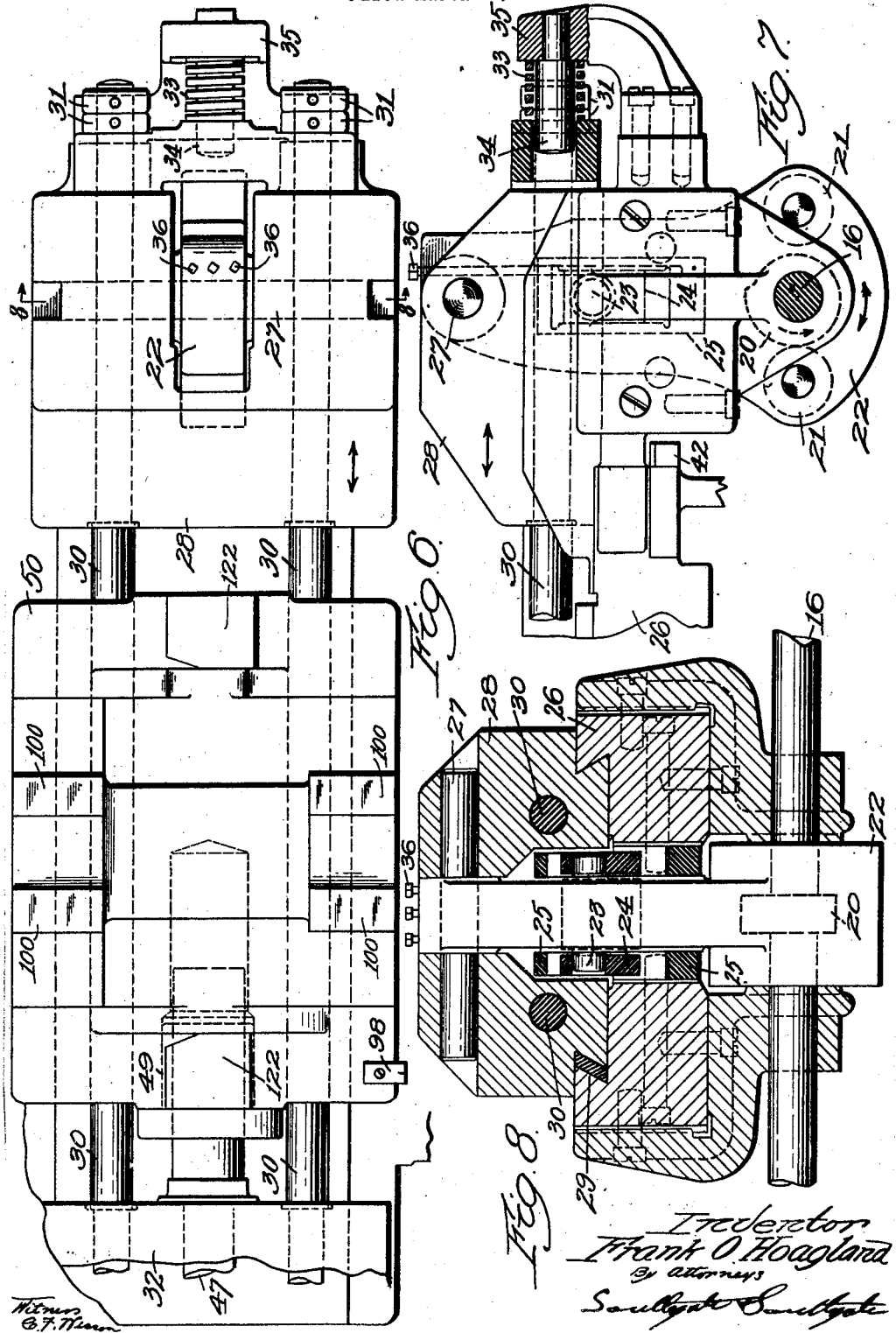

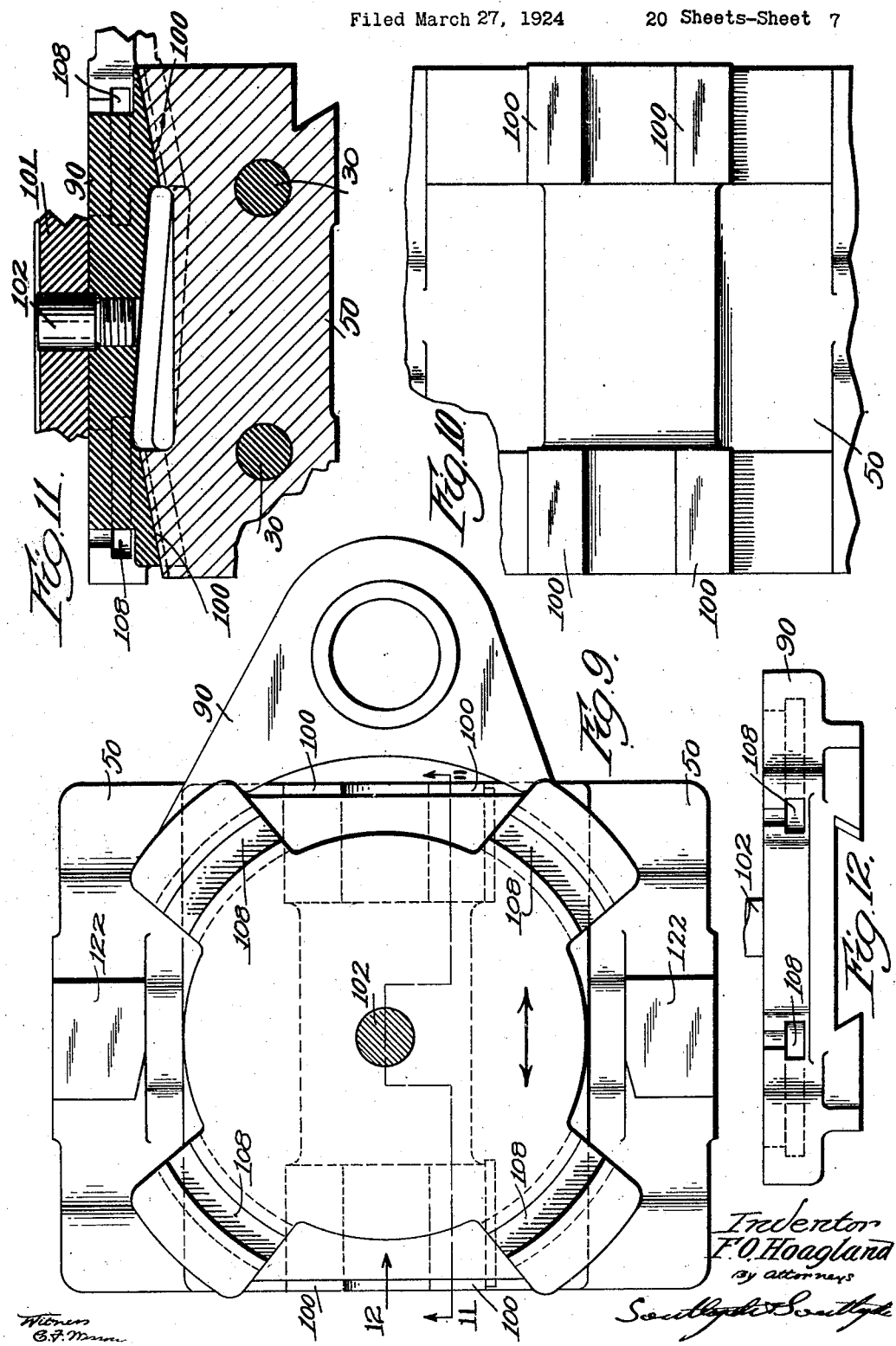

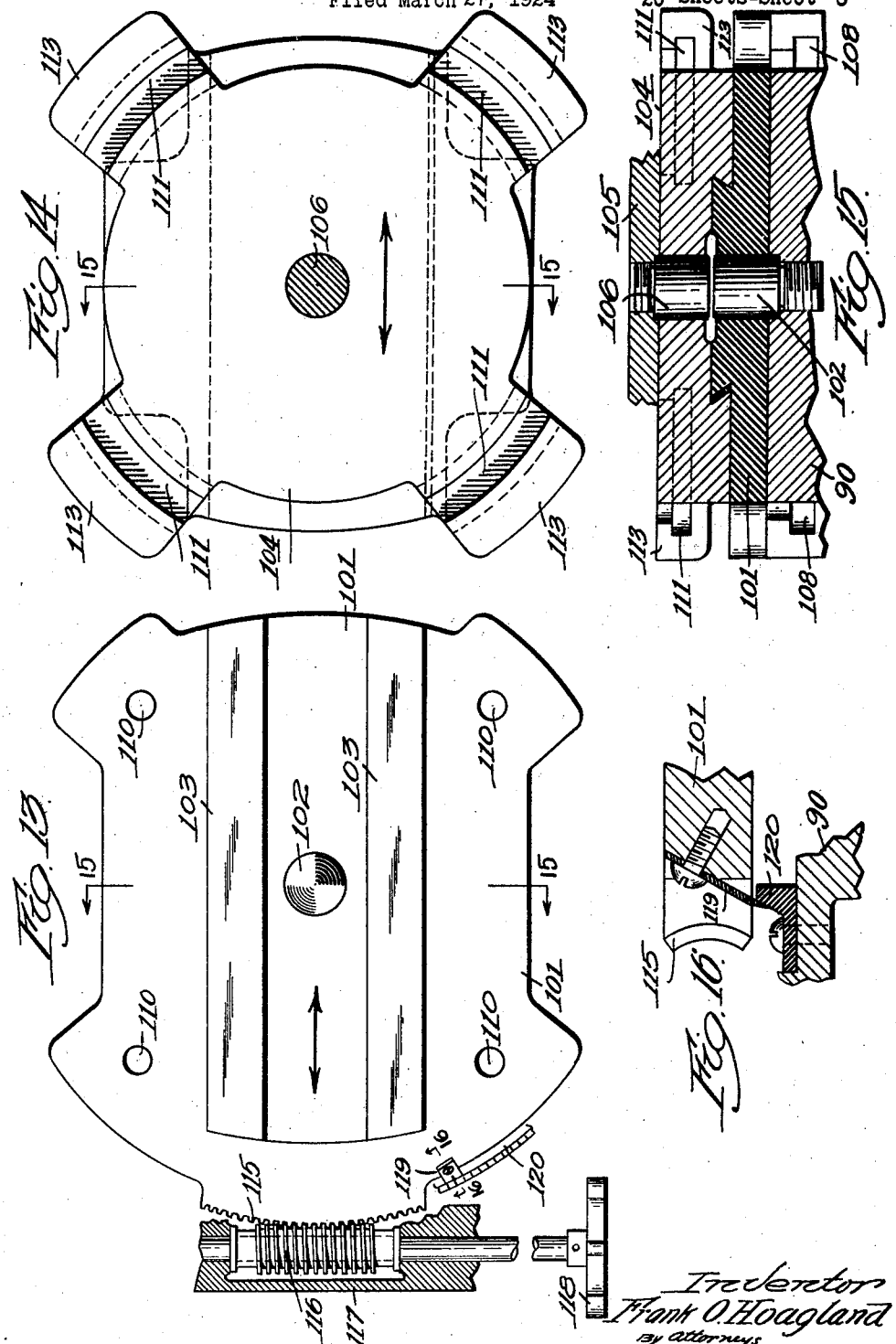

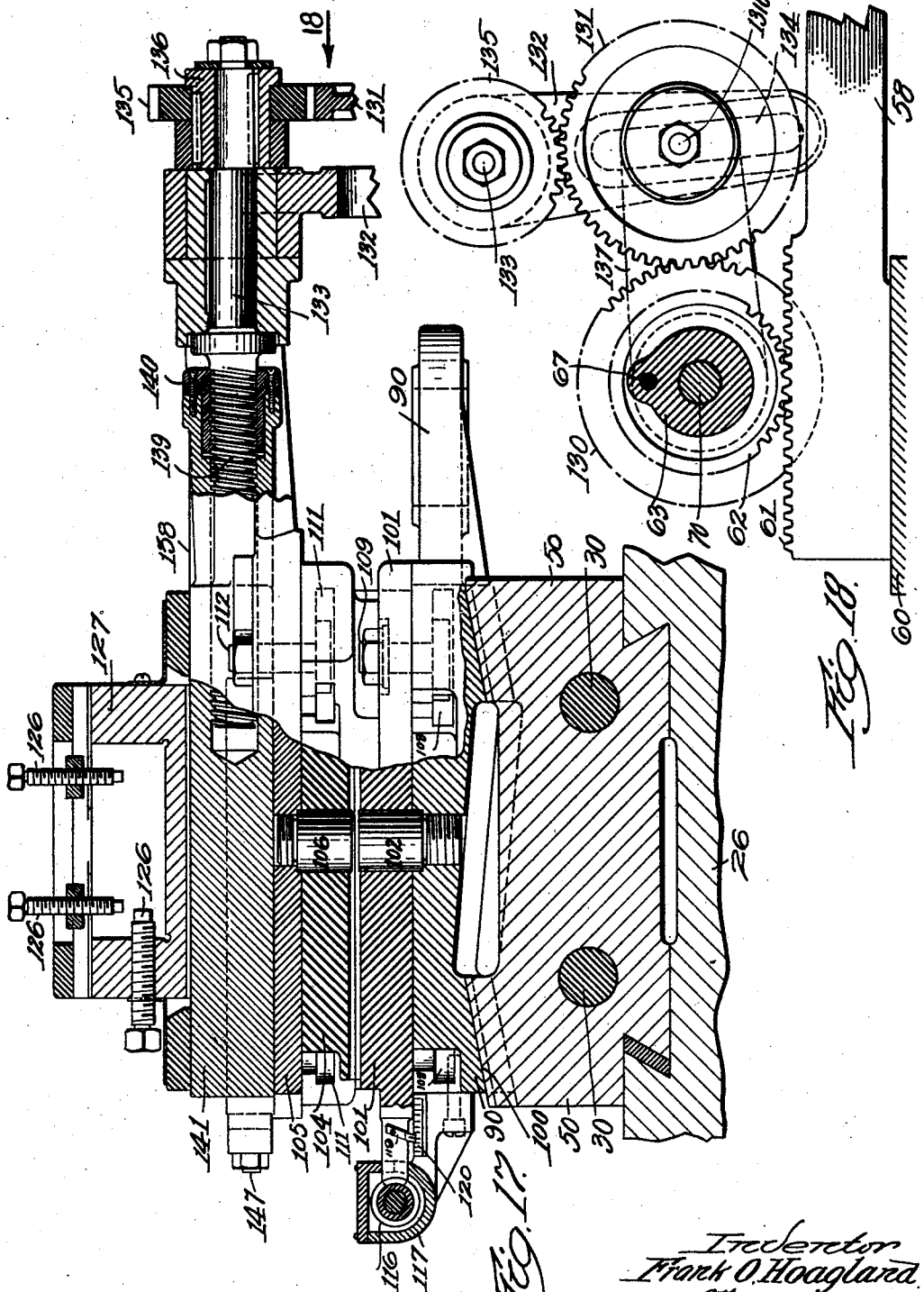

Dec. 18, 1928.  
F. O. HOAGLAND  
1,695,762  
BACKING-OFF DEVICE FOR CUTTERS HAVING ANGULARLY DISPOSED TEETH  
Filed March 27, 1924 20 Sheets-Sheet 10
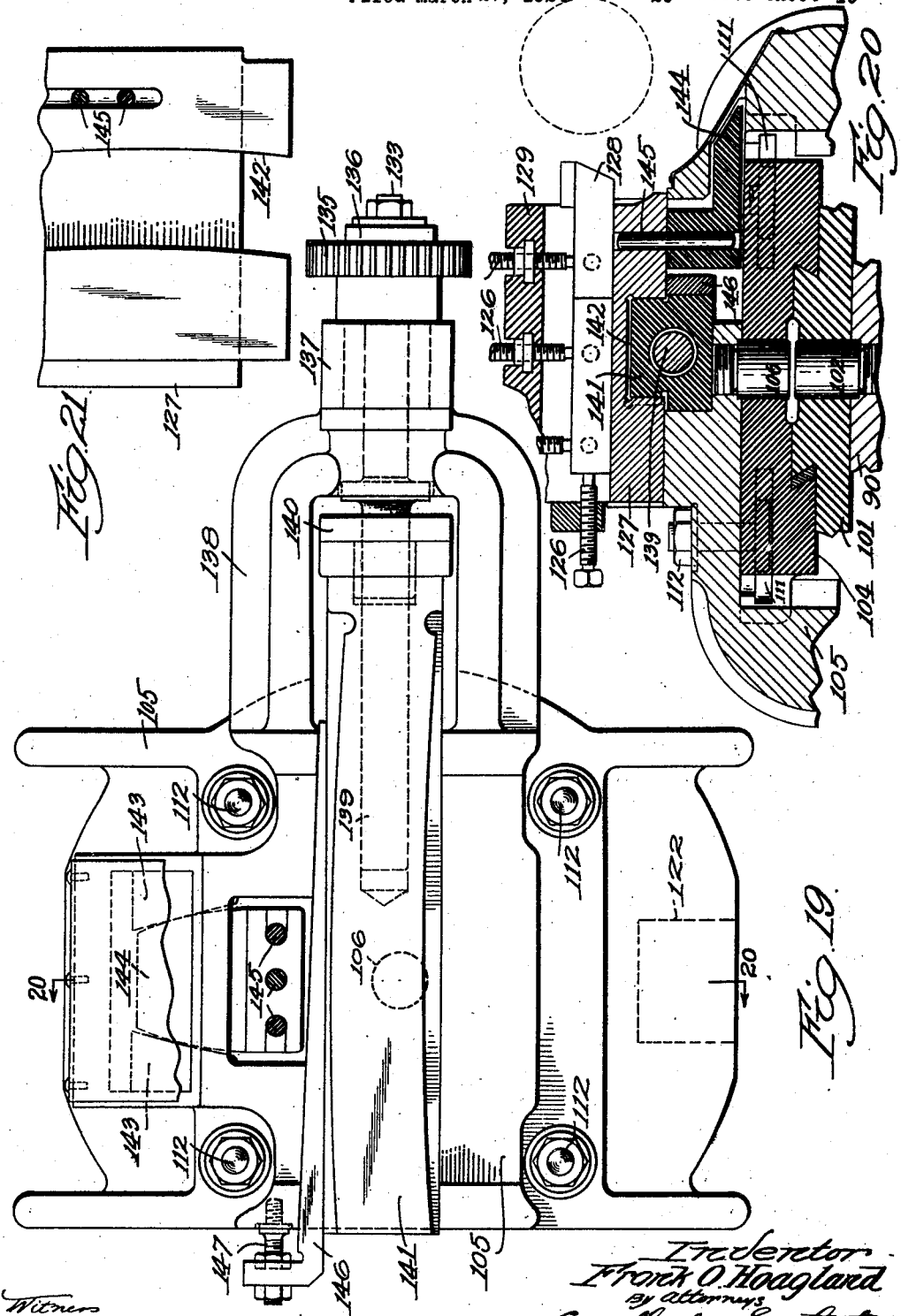

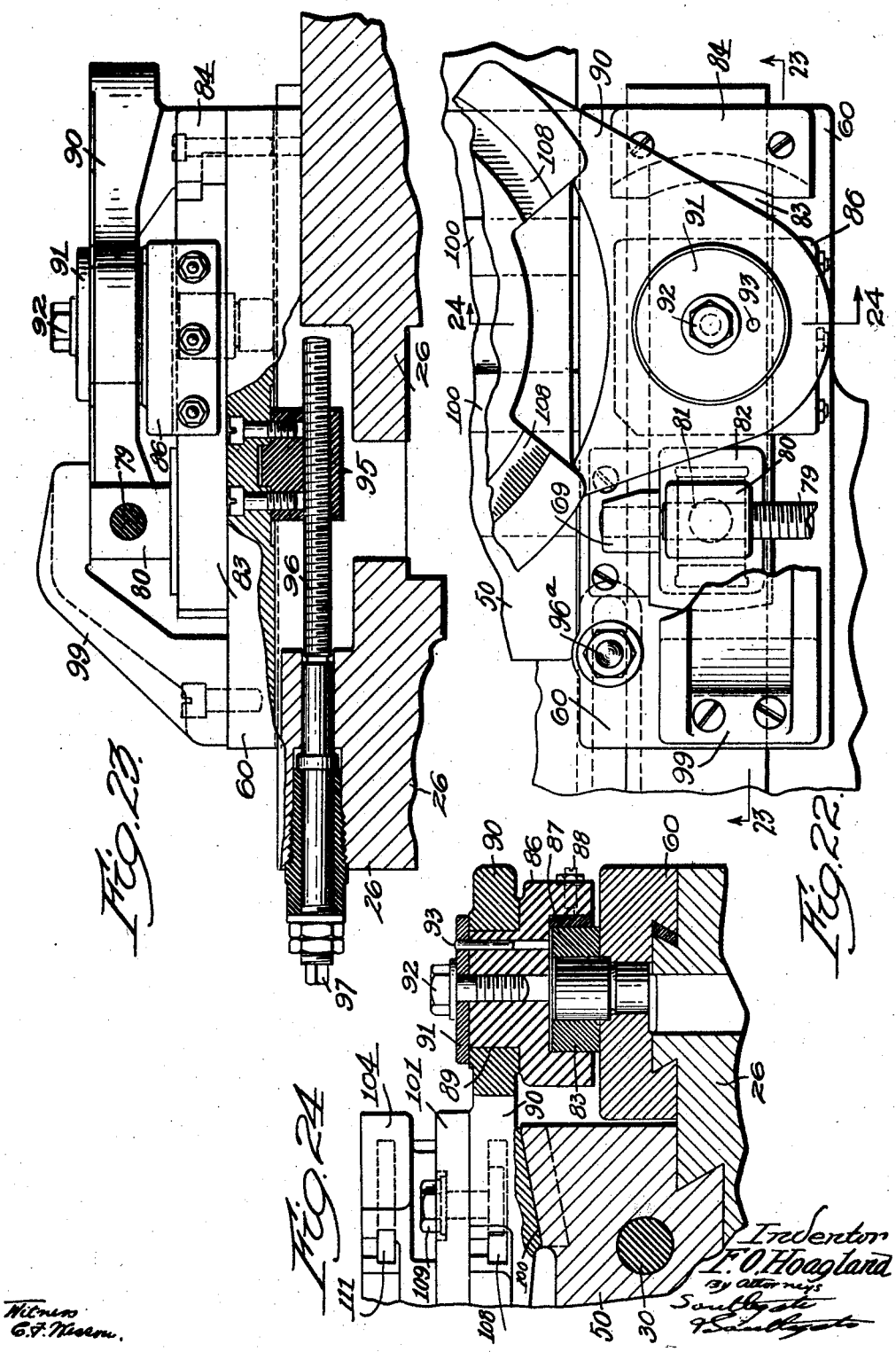

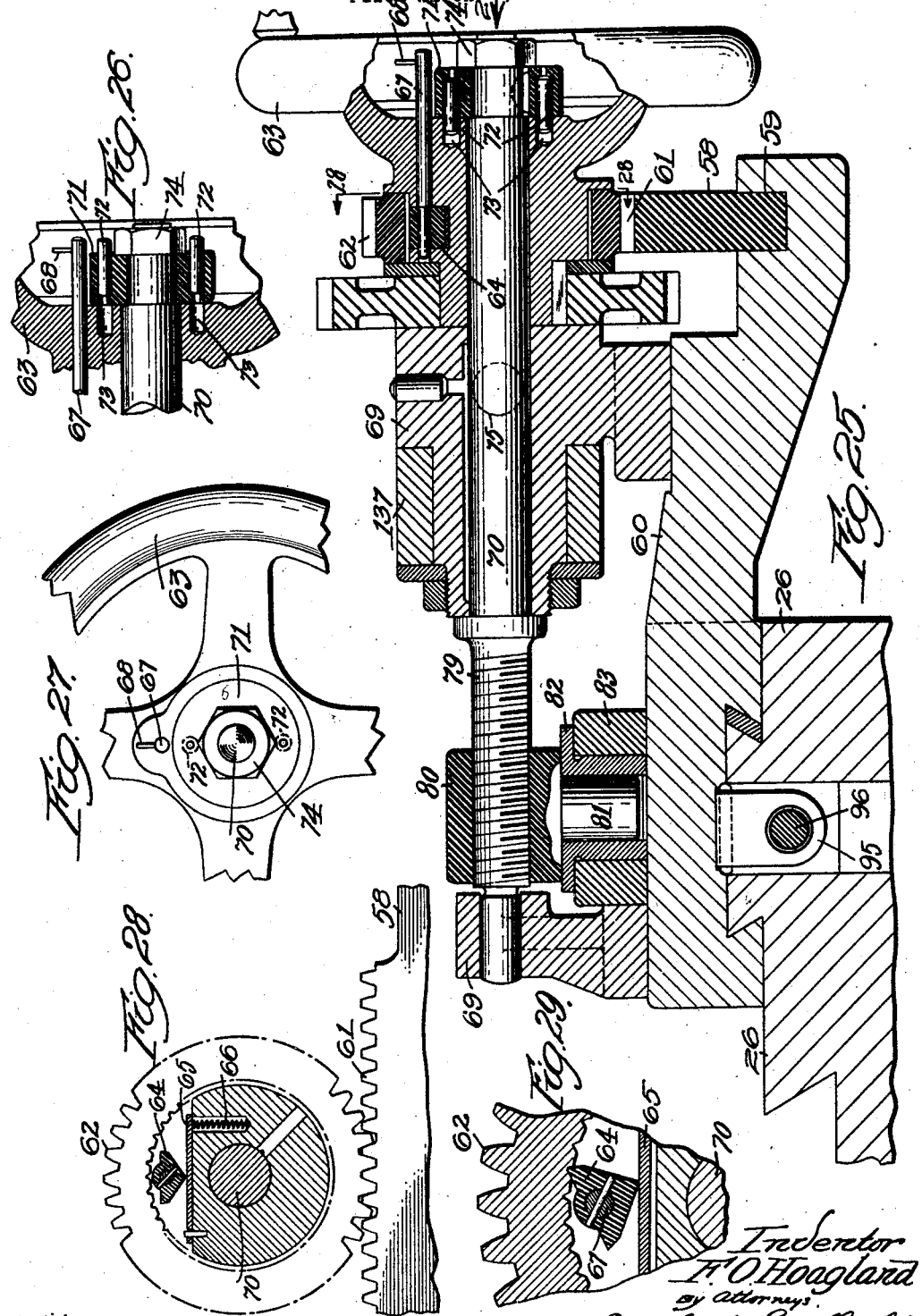

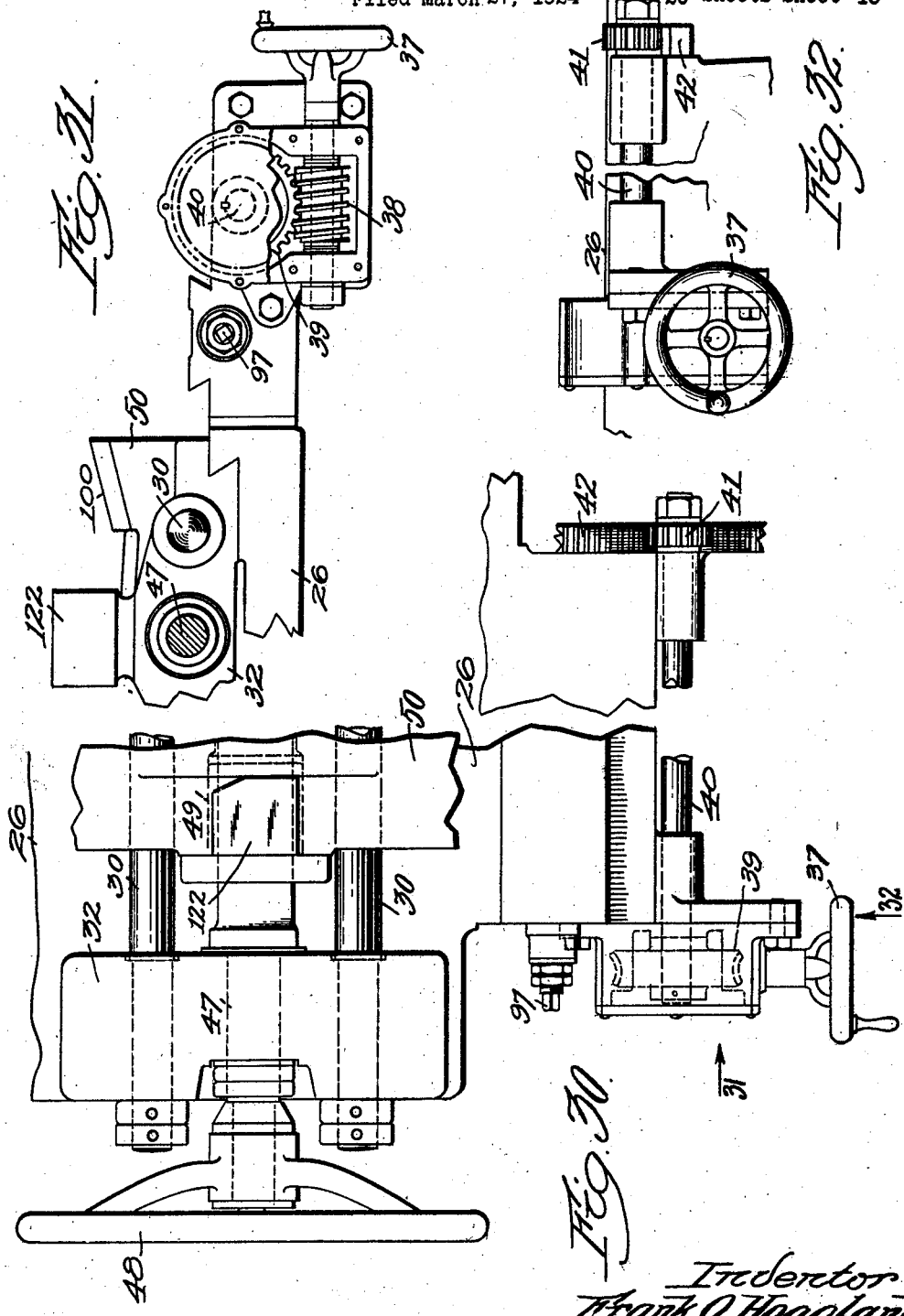

Dec. 18, 1928.  
F. O. HOAGLAND  
1,695,762  
BACKING-OFF DEVICE FOR CUTTERS HAVING ANGULARLY DISPOSED TEETH  
Filed March 27, 1924  
20 Sheets-Sheet 14

Dec. 18, 1928.　　　　　　　　　　　　　　　　1,695,762
F. O. HOAGLAND
BACKING-OFF DEVICE FOR CUTTERS HAVING ANGULARLY DISPOSED TEETH
Filed March 27, 1924　　　20 Sheets-Sheet 15
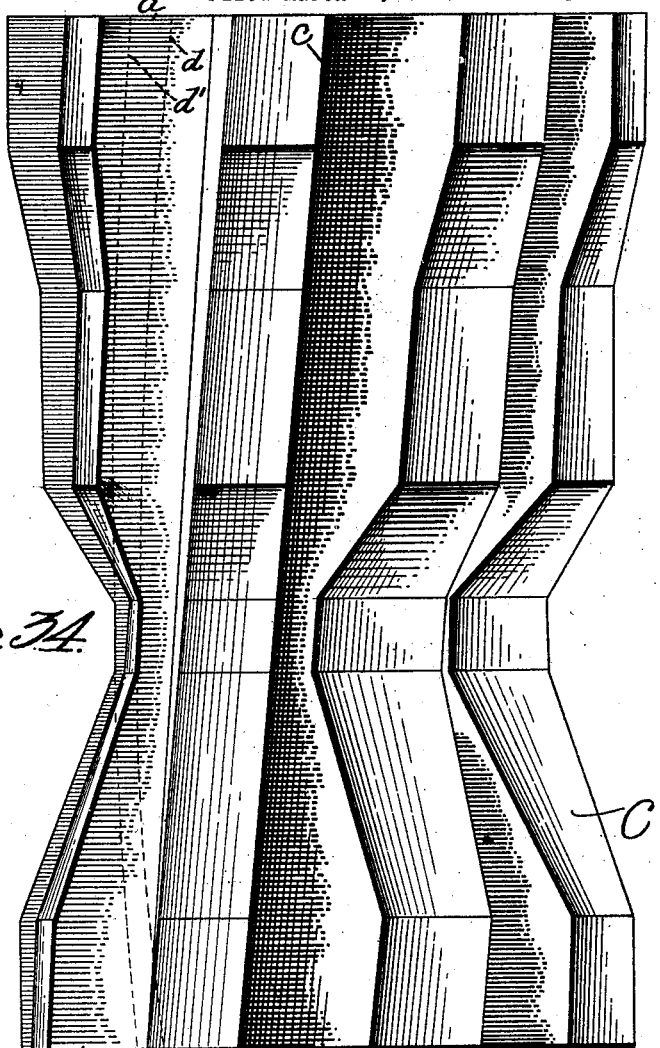
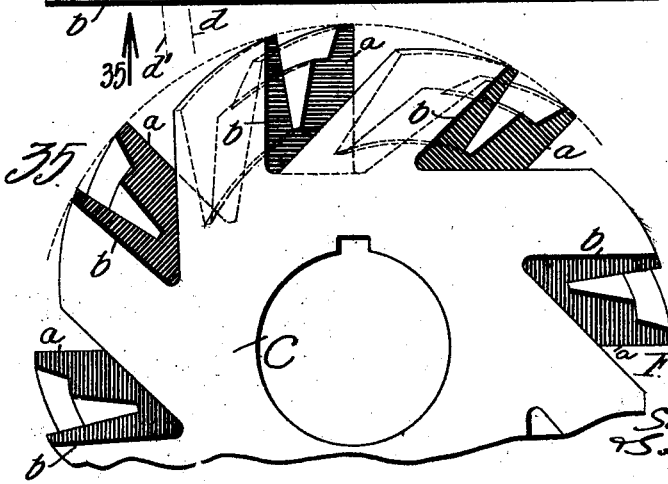

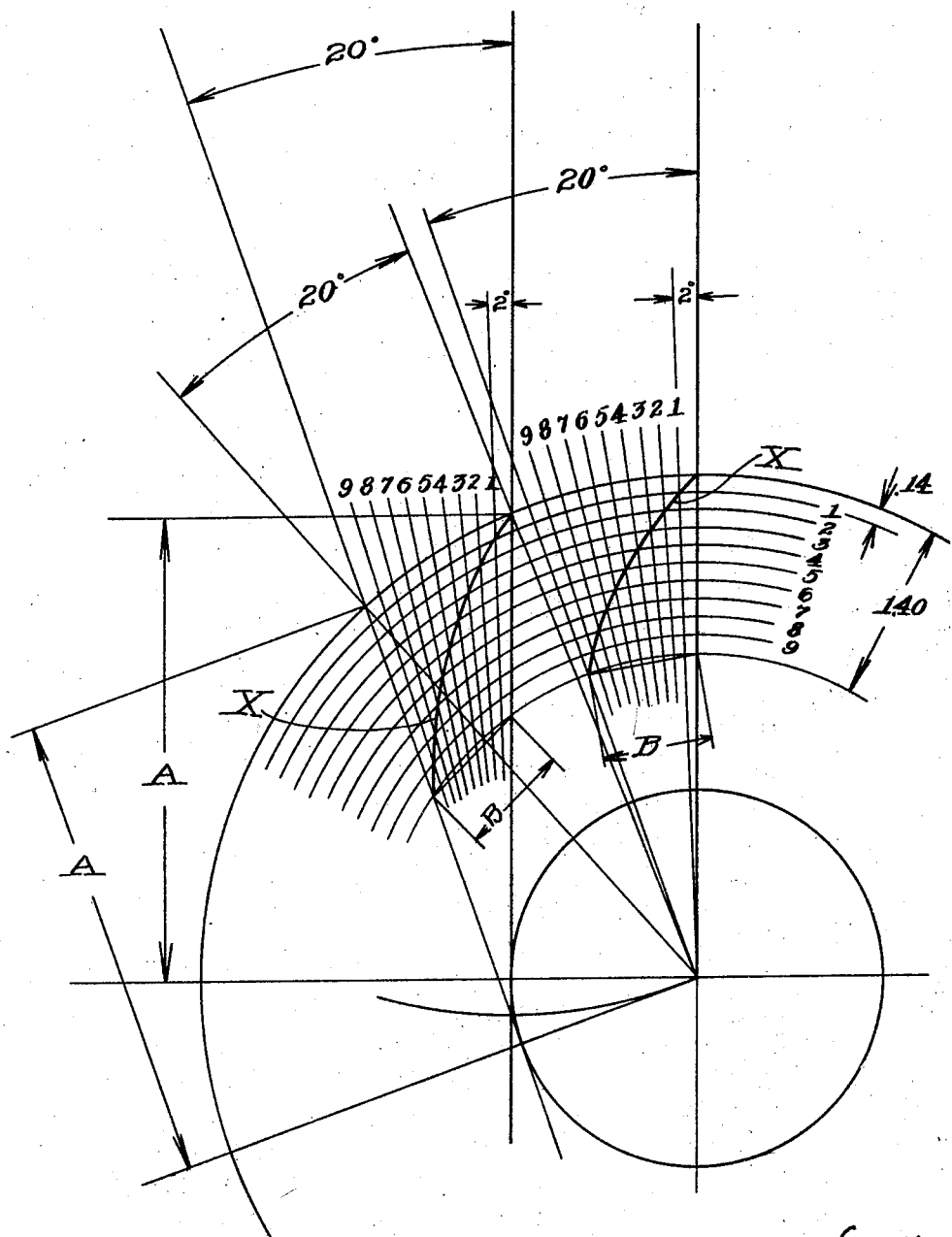

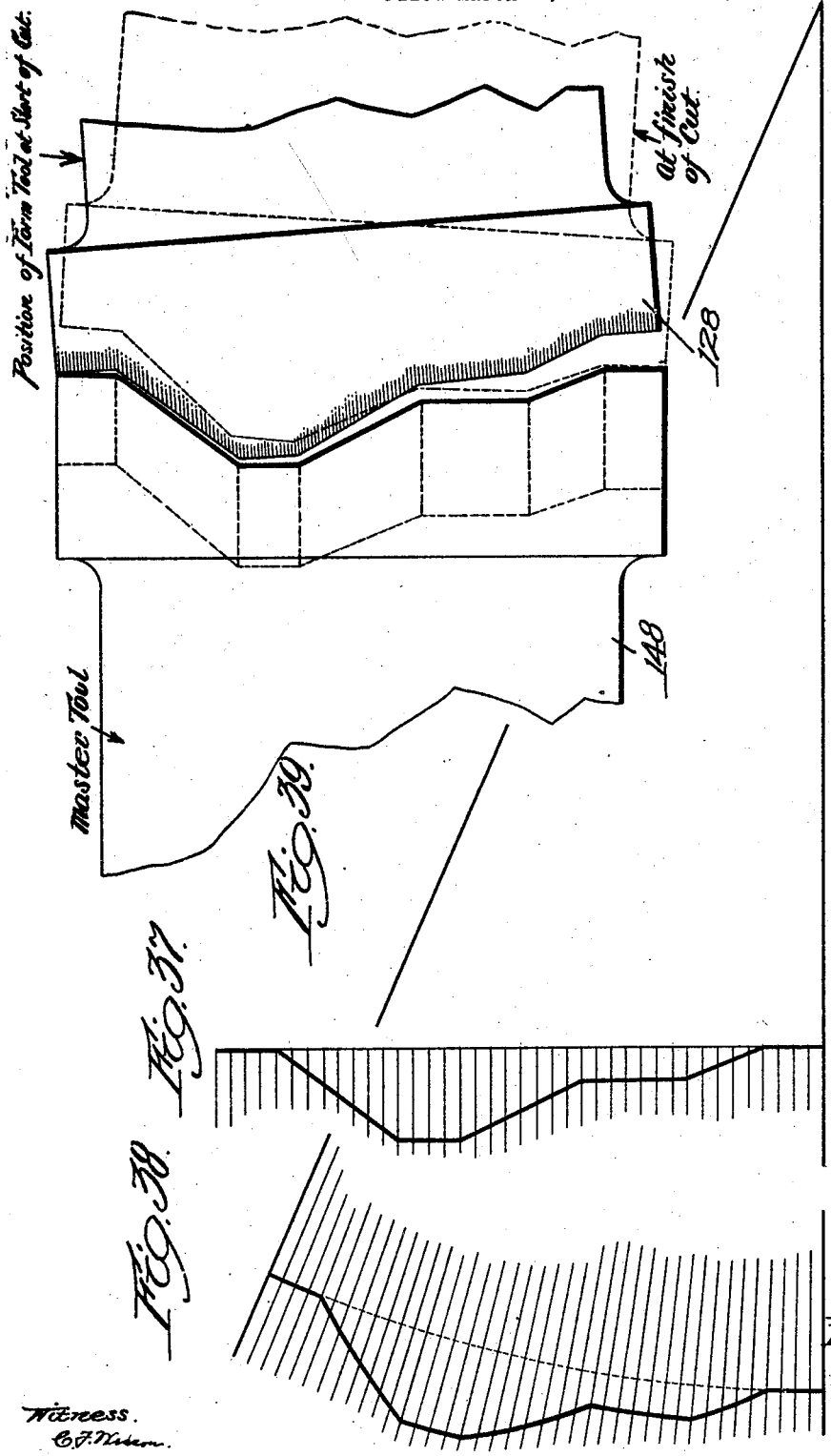

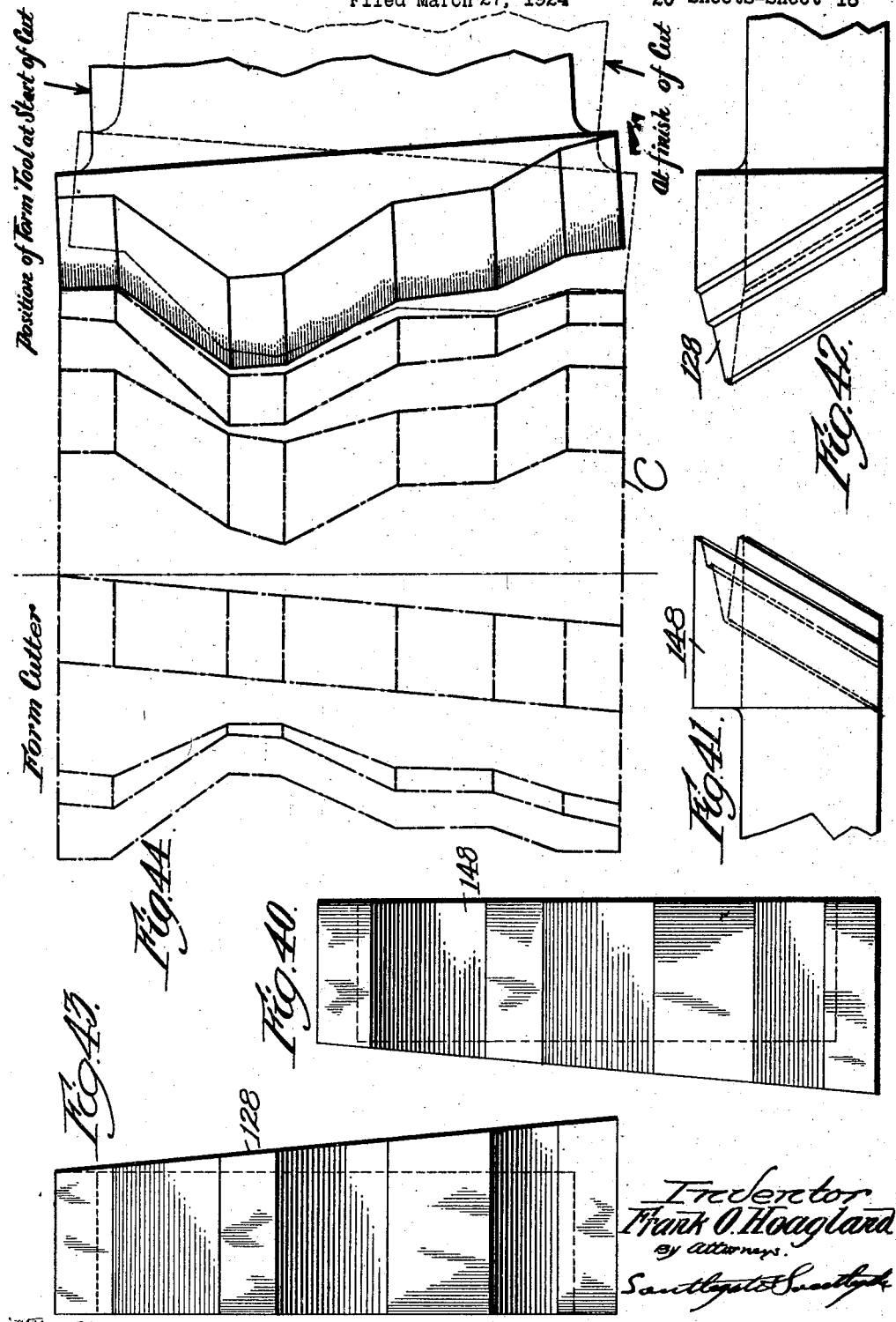

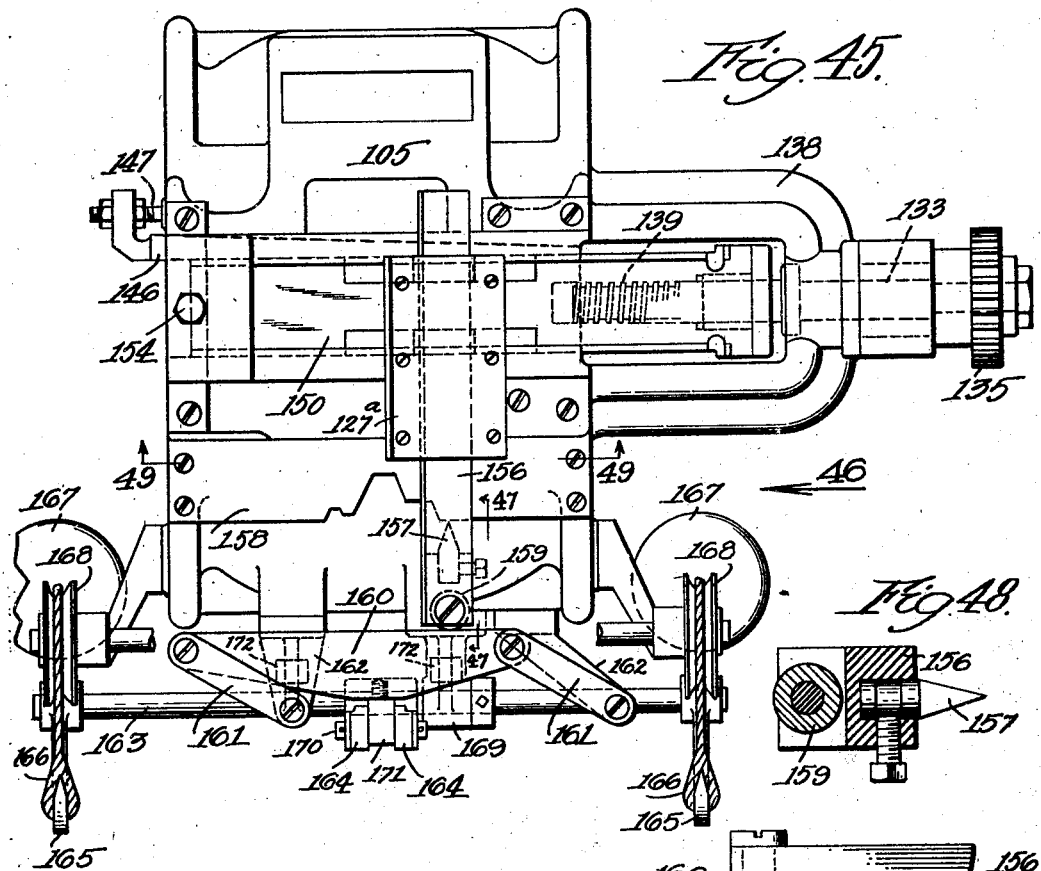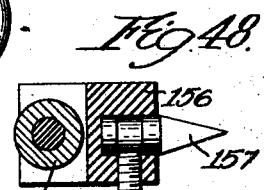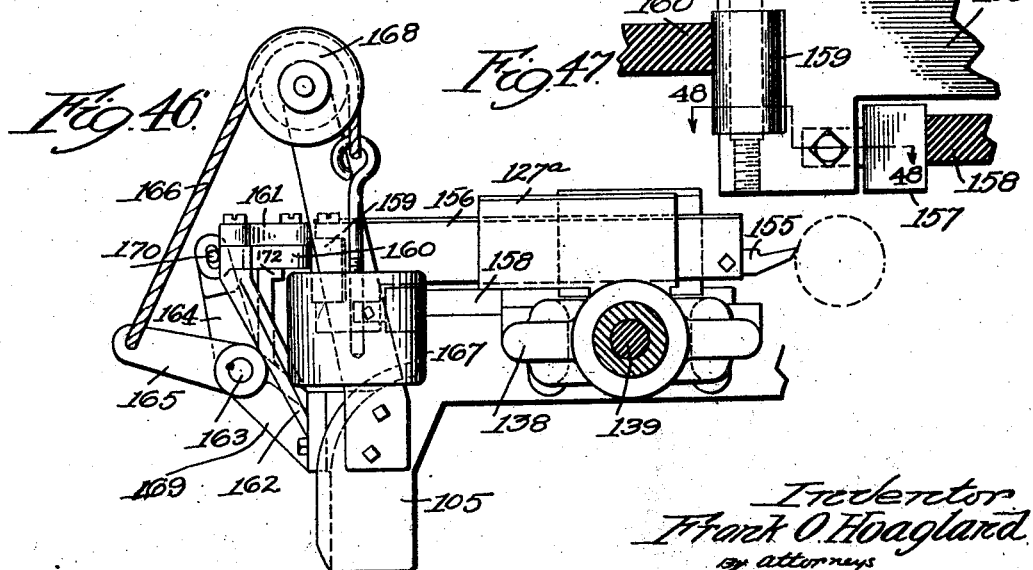

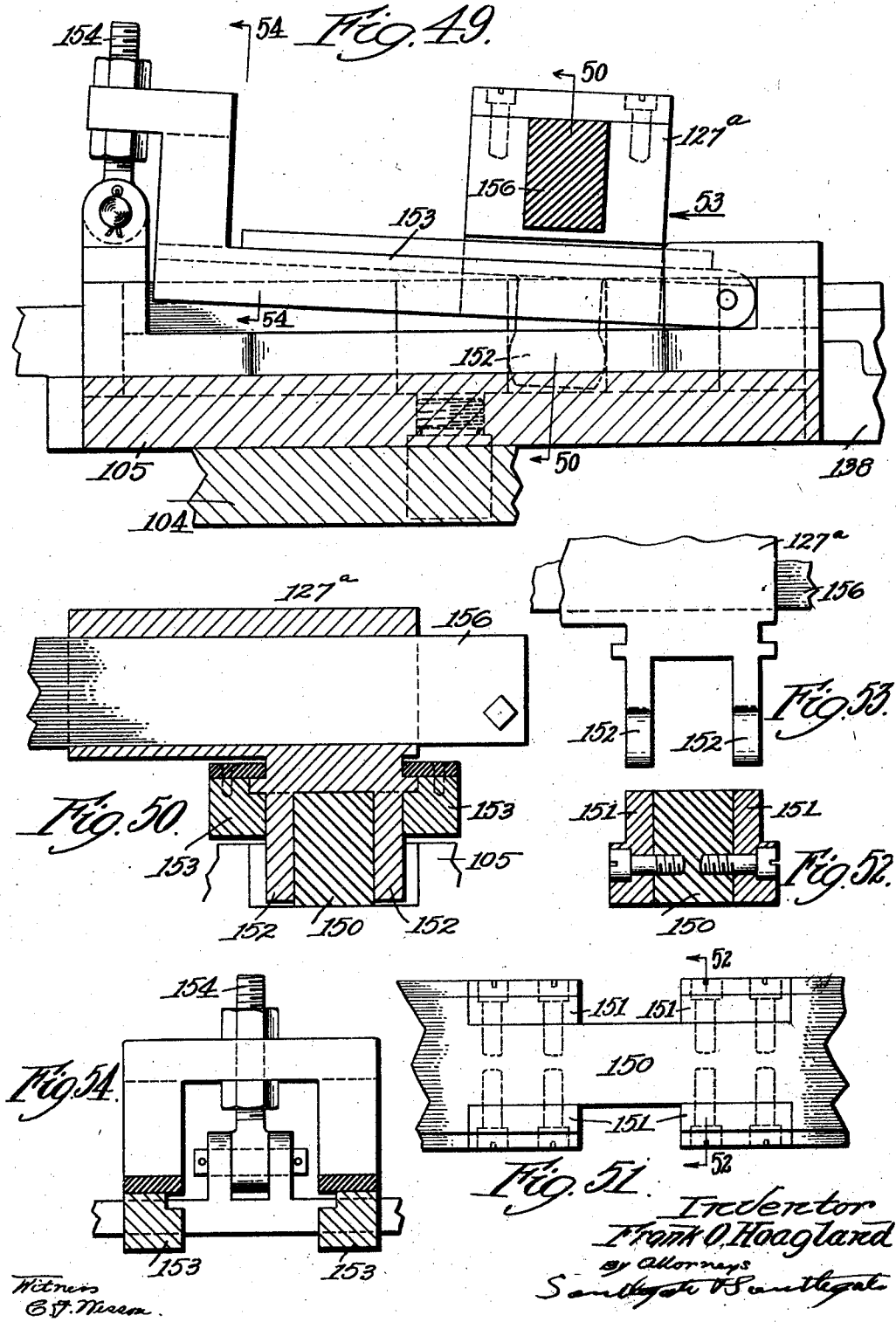

Patented Dec. 18, 1928.

1,695,762

UNITED STATES PATENT OFFICE.

FRANK O. HOAGLAND, OF WORCESTER, MASSACHUSETTS.

BACKING-OFF DEVICE FOR CUTTERS HAVING ANGULARLY-DISPOSED TEETH.

Application filed March 27, 1924. Serial No. 702,441.

This invention relates to a device for backing-off or relieving the teeth of rotary contour cutters in which the front surfaces of the teeth are flat and are arranged at an angle to a line constituting an element of a cylinder, i. e. tangent to a cone or double cone having its axis coincident with the axis of the cutter.

The principal objects of the invention are to provide simple and accurate means by which the cutting tool used in the backing-off process can be made to progress along the cutter in such a way as to cause it always to be making a finishing cut at one point along the cutting edge of the tool and prevent any point along the rest of the cutting edge of the cutting tool digging into the work at any time, that is cutting below the finished surface thereof; to provide means, cooperating with the usual feeding and withdrawing mechanism, for progressively periodically changing the elevation of the cutting tool to bring it nearer to or farther from the center of the work to compensate for the variation in the relief curves on the end of each tooth due to its angularity and also moving it horizontally back or forward toward or from the work to modify the usual feeding action enough to permit the tool to cut all of the end surfaces of the teeth which surfaces vary in width; to provide the last two elements either combined so as to produce a single angular motion to permit the tool to cut correctly at two points at different distances from the axis of the cutter, or in such relation to each other that they can be operated by a single cam or other mechanical element; and to so arrange them that they will necessarily leave the surfaces of the teeth of the cutter accurately in such a form that, as the angularly disposed flat forward surfaces of the teeth are ground away, the effective contour of the cutter will not change.

More specifically, the invention is used with any ordinary mechanism for operating the cutting tool back and forth toward and from the work for the purpose of relieving each tooth and then quickly withdrawing the cutter periodically as the work rotates, combined with other devices as stated above. It includes a tool having a convex cutting edge and means for rocking the tool on a straight line parallel with the axis of the work and on a long radius. This tool is mounted in a manner equivalent to that of fixing it on a wheel having the said radius and is operated in a manner equivalent to rolling the wheel along the said straight line so that the convex tool will cut into the work all the time throughout the length of the work but only at one point on the convex surface of the cutting edge will the tool be making its finishing cut at any time.

The edge of the tool to one side of this point makes a roughing cut on the work. The convex cutting edge of the tool has the same radius as the imaginary wheel and rocks so that this convex cutting edge will take its finishing cut at one point at any instant, which point moves along the work, and so that the rest of the cutting edge cannot at any time cut deeper than the finished surface of the cutter. With these features I combine means for changing the elevation of the tool periodically throughout the entire cutting operation so that the tool rolls progressively along the work to change the position of its finishing cut it will also change its elevation for the purpose of correcting the curves of the surface which it is cutting on the work to compensate for the variation in the shapes of their involute curves due to the angularity of the front surfaces of the rotary cutter teeth, and further combining all these features with means for simultaneously causing a progressive but intermittent change in the distance of the cutting tool from the center on which the work rotates for the purpose of traversing the said finished surfaces which vary in width along the teeth.

In further explanation of this statement of the objects of the invention, it should be said that the rotary cutter on which this machine is designed to operate is provided with teeth spaced apart like the ordinary rotary milling cutter teeth, but formed by cutting a straight triangular groove in the work between each two adjacent teeth. This groove instead of being made by a straight cut parallel with the axis of the cutter, or a spiral cut, is formed by a straight cut at an angle to the axis of the cutter and at an angle to an element of a cylinder formed on that axis. Thus this forms teeth on the cutter which are bounded on the front side by a plane surface. This surface, however, is not radial, except at one single point, but it is tangent to a cone having the same axis as the cutter. Furthermore, the angle which a line, drawn on this flat surface in a plane perpendicular to the axis of the cutter, makes with the axis is not the same at any two points along it. It changes progressively from one end of the cutter to the other. This plane surface on the front of each tooth may start at one end in a position in which it is situated in a radial direction and I have chosen a cutter so formed to illustrate this invention. But, as stated above, this plane surface, although it does not have any curvature whatever, changes its angle all the time with respect to a radius drawn at any point.

This cutter is placed on an arbor and rotated at a slow speed. In front of the arbor is located a tool slide movable by a cam or the like as usual to advance the tool to turn down a small area of the end of a tooth to the proper involute shape and then to withdraw it quickly to bring it into proper position to operate on the next tooth when it comes around. The operation, so far, is what is necessary in backing off a cutter having straight teeth radial on their front surfaces. In that case, however, the cutting tool, having the contour of the work or rotary cutter is able to make its finishing cut once for all in a single revolution of the work. In the present case the cutting tool also has the contour of the work, but that is modified slightly by the general convex shape of its cutting edge described above. This tool is rolled along as stated, so that at all times one point on it is nearest the work and is taking a finishing cut, the edge of the tool at the side toward which it is rolling also cutting, but that is only a roughing cut. At the completion of each rotation the tool is rolled a very slight distance, the tool is advanced or retarded with respect to its feeding slide and it is dropped or raised slightly so no two revolutions are made with the tool in the same position with respect to any of these adjustments or corrections.

The result of this construction and operation is that the point on the circle at which the cut begins on the forward edge of the tooth, for the purpose of backing it off varies all the time from one end of the cutter to the other even where the contour is straight. Also, the point of emergence from the back of the tooth varies not only circumferentially but also radially because the involute curvature of the relieved surface varies all the way from one end to the other and, in the form shown, the rear end of this involute surface at a low spot on the tooth curves in toward the center more than a more distant surface and also as the cut progresses these surfaces extend further back. These involutes must always be of such a nature that, when equal amounts are ground off the plane forward surface above referred to, the effective contour of the cutting tool edge will be the same as its original contour. In other words this grinding for the purpose of sharpening must reduce the distance of the cutting edges from the axis uniformly as the contour of the tooth on its outer side varies. It is always a spiral but the circle at which it starts is at different points along the surface of the cone above referred to. In addition to the motion out and in to back off the teeth of an ordinary straight cutter and withdraw the tool, this necessitates the change in elevation at each rotation of the work. Furthermore, it indirectly necessitates the variation in the position of the cutting tool toward or from the rear of the teeth, in addition to the feed of the tool. This is due to the fact that on account of the variation in the relief outline of the finished tooth as the cut progresses from end to end thereof, the length and position of this curve on the tooth also varies and the cutter must move far enough to cover it all in a circumferential direction.

Furthermore, if it be assumed that the height of the tooth is to change suddenly, that is, dropped from one diameter to a smaller one, it would be obvious that the spiral curve on which the tooth is to be relieved at its larger diameter would be different from the spiral curve on which it will have to be relieved at the smaller diameter, these curves being assumed to be located at the same point longitudinally of the work. Yet, the same cutting tool has to relieve both surfaces. Obviously this cutting tool will therefore cut the two relieved surfaces at different points along the tooth at substantially the same instant. The cutting tool cannot be stretched or changed in length between the two points at which it cuts. Therefore in order to enable it to cut both curves correctly, it must be tilted so that its inner cutting point may have a different relationship to its outer one from the one it would have if the tool were kept on a horizontal line, it being understood that the tool normally cuts and moves substantially in a horizontal direction and nearly parallel to its upper surface. In order to provide for this difficulty, I correct both the inward and outward motion of the tool described above and the elevation of the tool to get the effect of tilting the tool and compensate for this difference in shape of the spiral relief curves at a different distance from the center but at the same point along the cutter. To do this I find the maximum and minimum radius which the particular cutter has and provide the corrections just mentioned in such a form that they will just take care of the difference at the extreme end of the cutter. On account of the progressive motion of the cutting tool from one end to the other and the fact that no correction is made for this difficulty at the starting end of the cutter, I am able to correct it all the way along. That is, the average correction from one end to the other will take care of this difficulty at all points along the cutter, but of course it is to be understood that I do not necessarily avoid all correction at one end of the cutter. That is done only when the front end surface of the tooth is radial at that point, as it is in the example I have chosen to illustrate this invention.

Certain parts of the invention, as for example the rolling motion, can be used more broadly and are not limited always to backing-off mechanism. The invention also involves a single point cutter construction to get equivalent results and a new method of producing the form tool as well as the cutter itself.

Reference is to be had to the accompanying drawings, in which—

Fig. 2 is an end view of the same;

Fig. 3 is a plan of a part of the machine on a larger scale;

Fig. 4 is a front elevation of the saddle and connected parts on enlarged scale;

Fig. 5 is an end view of the same as indicated by the arrow 5 in Fig. 4;

Fig. 6 is a plan of the main slide and the parts immediately carried on it;

Fig. 7 is a side view of a portion of the same with the parts in section at the center;

Fig. 8 is a transverse sectional view of the same on the line 8—8 of Fig. 6;

Fig. 9 is a plan of the vertical adjustment slide shown supported on the main slide;

Fig. 10 is a plan of a part of the main slide;

Fig. 11 is a sectional view on the line 11—11 of Fig. 9;

Fig. 12 is a side view of the vertical adjustment slide, as indicated by the arrow 12 in Fig. 9;

Fig. 13 is a plan of the lower swivel slide;

Fig. 14 is a plan of the upper swivel slide;

Fig. 15 is a transverse sectional view of the two swivel slides assembled taken on the lines 15—15 in both of Figs. 13 and 14;

Fig. 16 is an enlarged sectional view on the line 16—16 of Fig. 13;

Fig. 17 is a vertical sectional view on the line 17—17 of Fig. 3;

Fig. 18 is an end view of certain parts shown in Fig. 17, as indicated by the arrow 18 therein;

Fig. 19 is a plan of the upper guide plate, radius bar, and connected parts;

Fig. 20 is a central sectional view of the same on the line 20—20 of Fig. 19;

Fig. 21 is a plan of the guide plate shown in Fig. 19 with the radius bar removed to show the cam slot for it;

Fig. 22 is a plan of the parts connected with the vertical adjustment slide for operating the same;

Fig. 23 is a vertical sectional view on the line 23—23 of Fig. 22;

Fig. 24 is a sectional view on the line 24—24 of Fig. 22;

Fig. 25 is a sectional view on the line 25—25 of Fig. 3;

Fig. 26 is a similar sectional view of a portion thereof with certain parts reversed to alter the action of the device;

Fig. 27 is an end view of the hand wheel shown in Fig. 25, as indicated by the arrow 27 therein;

Fig. 28 is a transverse sectional view on the line 28—28 of Fig. 25 showing the pawl in neutral position to prevent feed;

Fig. 29 is a similar view on an enlarged scale showing the pawl in operative position;

Fig. 30 is a plan of the means for operating the saddle and supporting the main slide thereon;

Fig. 31 is a front view of the same as indicated by the arrow 31 in Fig. 30, the adjusting rod being cut away as shown in section;

Fig. 32 is an end view of the parts indicated in Fig. 30 as indicated by the arrow 32 therein;

Fig. 34 is a plan of a rotary cutter adapted to be relieved or backed off on this machine;

Fig. 35 is an end view of the same;

Fig. 36 is a mathematic diagram showing the relief curves of a cutter constructed like that shown in Fig. 35 but with the curves considerably exaggerated from those I have illustrated in the latter figure;

Fig. 37 is a diagrammatic view showing the form of a cutter not exactly the same in detail as the one shown in Fig. 34 as it would be if the teeth were not slanted;

Fig. 38 is a similar diagrammatic view of a cutter of the same contour as it would appear if the radius of the rocking motion were greatly shortened to exaggerate the curvature;

Fig. 39 is a view of the master tool for use in forming the form tool and illustrating the rocking of the form tool to secure the cutter outline shown in Fig. 37;

Fig. 40 is an end view of the master tool;

Fig. 41 is a side view of the same;

Fig. 42 is a similar view of the form tool;

Fig. 43 is an end view of the form tool;

Fig. 44 is a view similar to Fig. 39 showing the formation of the cutter blank by the form tool and illustrating the rocking of the latter.

Fig. 45 is a plan of a modified machine using a former instead of the radius bar;

Fig. 46 is an end view of the same looking in the direction of the arrow 46 in Fig. 45;

Figure 1:
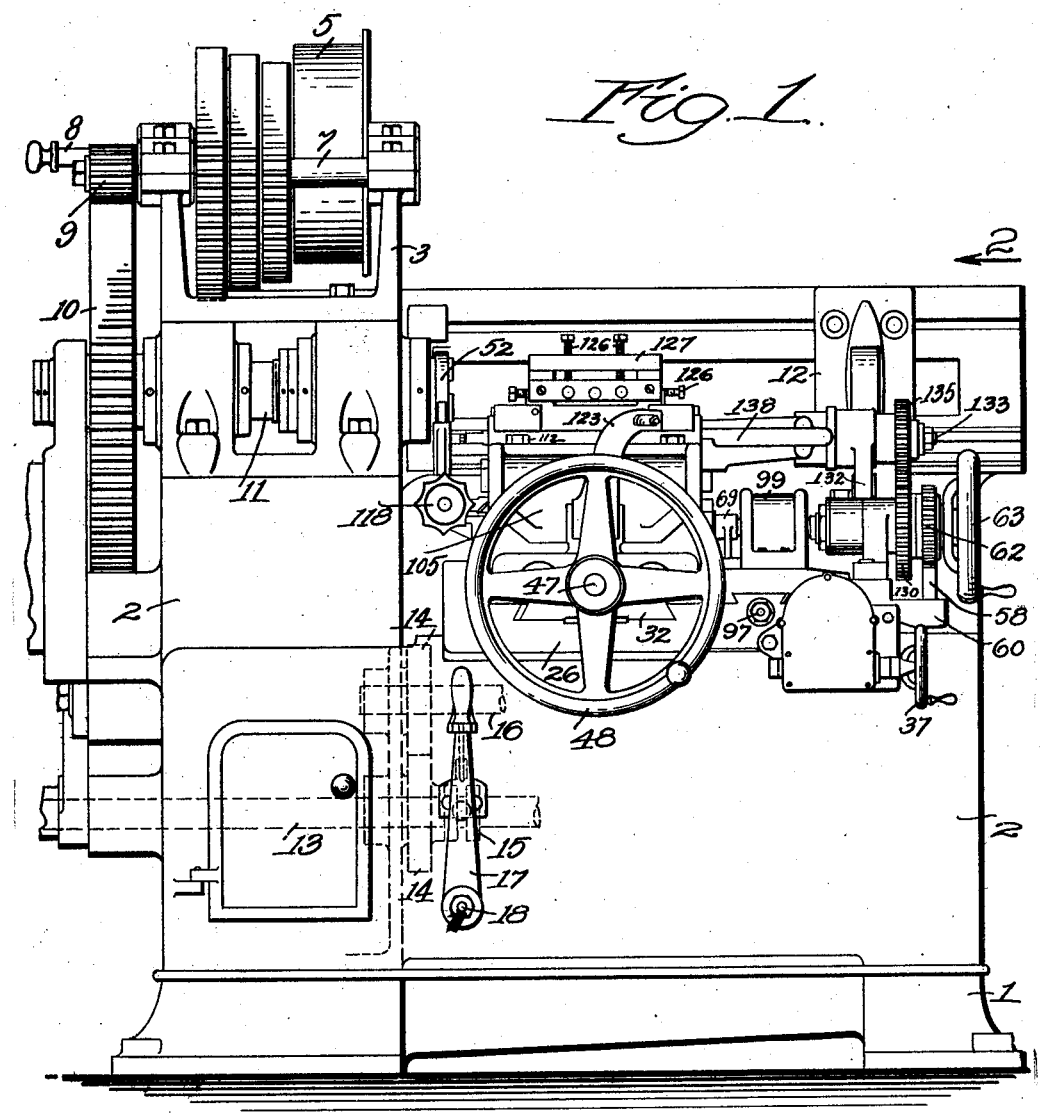
Fig. 1 is a front elevation of a backing-off machine constructed in accordance with this invention.

Figs. 47, 48 and 49 are sectional views on the lines 47—47, 48—48 and 49—49 respectively of Figs. 45 and 47;

Fig. 50 is a sectional view of the tool holder and its support on the line 50—50 of Fig. 49;

Fig. 51 is a side view of the sliding bar;

Fig. 52 is a transverse sectional view thereof on the line 52—52 of Fig. 51;

Fig. 53 is a side view of part of the tool holder as indicated by the arrow 53 in Fig. 49; and Fig. 54 is a sectional view on the line 54—54 of Fig. 49.

*The present backing-off machine.*

For the sake of convenience, I have shown this machine as used in connection with, and in fact constituting a substitution for, certain parts of an ordinary backing-off machine for use in backing-off the teeth of cutters in which the front surfaces of the teeth are radial, although I am aware of the fact that this invention is not limited to that particular type of backing-off machine. Certain parts of the old machine are shown herein as comprising a base 1 supporting a frame 2 which carries brackets 3 at the top for supporting a shaft 4 which carries a pulley 5 that receives power from a counter shaft through a belt. In this type of machine the shaft 4, through speed change gears, drives a parallel shaft 7. A controlling rod 8 is shown for changing the speed but the details of the elements operated by this rod are not shown as they are well understood. On the shaft 7 is a pinion 9 operating a gear 10 on the main work shaft 11 on which the cutter C to be backed off is mounted. It will be seen therefore that while the machine is running this cutter rotates constantly at a very slow speed with the shaft 11. This shaft is supported at a distance from its bearing on the frame 2 by a bracket 12 having a bearing for it.

Through suitable gearing the shaft 11 drives a lower parallel shaft 13. This by means of a pair of gears 14 and clutch 15 drives a parallel cam shaft 16. The operation of this clutch 15 is controlled by a lever 17 on the front of the machine mounted to swing with a rod 18. This cam shaft 16 is provided with a cam 20 (see Figs. 7 and 8) rotating constantly and at the end of each rotation moving a pair of cam rolls 21 sideways slowly and then drawing them back quickly and leaving them in neutral position throughout most of the revolution. These rolls are mounted on studs fixed on a cam rocker 22 which is pivoted on a stud 23 carried by a block 24 and capable of sliding up and down, but not moving sideways, in a vertical slot in a block 25 carried by a saddle 26. This cam rocker 22 extends up above its pivot and is pivoted to a stud 27 carried in a perforation or slot in a back yoke 28. The saddle is provided with ways 29 in which this back yoke slides. The back yoke is provided with perforations in which a pair of guide rods 30 are located and fixed by check nuts 31. These two rods 30 are also provided at their ends with a front yoke 32 likewise fixed to the other ends of these rods and moving with them. These two yokes are both mounted in the same kind of ways on the saddle and they are connected together positively by the rods 30. Therefore they both slide on the saddle in accordance with the operation of the cam 20. The operation of these two yokes back and forth by the cam is made possible by a spring 33 on a stud 34 abutting against the stationary end 35 of a bracket fixed on the saddle. Three vertical bolts 36 are shown for adjusting the block 25.

It should be stated at this time that the saddle can be adjusted along the bed and consequently the main work shaft 11 by hand wheel 37 on a worm 38 (Figs. 30, 31 and 32) which worm operates a worm wheel 39 on a shaft 40 which extends directly back from the front of the saddle and underneath it. On the rear end of this shaft 40 there is a pinion 41 meshing with a fixed rack 42 arranged horizontally and parallel with the main work shaft 11. This wheel 37 therefore can be rotated to adjust the saddle along the work as may be desired but after it is once adjusted it is not intended that it be fed or moved in this direction according to the present invention. In other respects the parts so far described in detail are taken from the old machine and are not a part of this invention, except as they cooperate with the new features that will now be described.

Rotatably supported on the front yoke 32 is a shaft 47 having a hand wheel 48 thereon for rotating it. This shaft is provided with a screw thread entering a nut 49 carried by a main slide 50. This main slide is adjustable back and forth along the rods 30 and when adjusted moves with them at all times. It will be understood that if the backing-off form tool were carried directly by the main slide and the adjustments so far described were used for ordinary adjusting purposes as they are, the action of the machine would be the same as the action of the old backing-off machine. The cam 20 forces the main slide gradually forward in an increasing amount so as to cut a spiral on the back of the tooth with the cutter rotating constantly but slowly, and when that is finished, the cam will rapidly bring the form tooth back out of contact with the work or cutter ready to be advanced again when the next tooth comes around.

*The new cutter.*

In the present case the problem, while starting at this point is different from now on. With a cutter C having one end *a* of the tooth radial (see Fig. 35) and the other end *b* of the tooth in a plane but swinging outwardly as we progress on from one end of the cutter to the other so that this plane *a—b* is tangent to an imaginary cone as stated above, the backing-off tool 128 has to work at first on the same principle as has been the case with the ordinary radial tooth cutters above referred to. However, after the first cut at the end $a$ of the cutter, the curve which is to be cut on the end of the tooth varies all the way across in accordance with the distance from the end of the cutter at which the start is made.

It is from here on, therefore, that this invention performs its functions and it is designed for the purpose of modifying the shape of the ordinary cutter which apparently is in the form of true Archimedean spiral. The modifications, generally speaking, are to increase the advance of the cutting tool beyond that which has heretofore been required and make this increase progressive. In other words, this increase is itself gradually increased as we progress from one end of the cutter to the other. Also, there is a change in the elevation of the tool necessitated by the change in the curvature which is to be provided for. I might remark at this point that both of these means are complicated by the fact, as stated above, that, while they would be necessitated anyway, their amount is modified by the necessity for having the tool able to perform a proper cutting action at the points at which the teeth are nearest the center of the cutter as well as at the points to which they are farthest away from it. Theoretically this would necessitate tilting the tool but I accomplish this object by modifying both the elevation and the longitudinal position of the tool as it moves from its starting point so as to secure in these two operations all the correction necessitated by all these conditions.

I shall speak here of a rotary milling cutter C as shown in Fig. 35, having the front faces of its teeth radial at one end. However it is to be understood that the point at which these surfaces are radial might be between the ends of the cutter, or it might be beyond the cutter i. e. imaginary. The example I have used is a practical one because it is the simplest form.

Fig. 36 is a diagram showing relief curves of a cutter of this type and showing how such curves can be developed. The vertical radial line represents the radial end edge of a tooth. The parallel line tangent to the small circle represents the opposite end edge of the same tooth. The small circle is the base of the imaginary cone to which the plane of the front of the tooth is tangent. The line from the center of the circle perpendicular to this tangent is not intended to show the radius of the circle but an element of the cone at which the above mentioned plane is tangent to the cone.

The arcs 1, 2, 3, etc. are drawn at equal distances apart, these distances equalling the drop or recession of the backing off curve. One set of straight radial lines marked 1, 2, 3, etc. are drawn from the center to represent equal angular distances as in this case 2°. The other set of straight lines 1, 2, 3, etc. are drawn in the same way but are not radial, so the two relief curves X are developed by drawing them through the successive intersections of these lines 1, 2, 3, etc. of the two sets, 1 with 1, 2 with 2, etc. They show the recession toward the center for each 2° of progress circumferentially. These two curves X are not identical and curves drawn in the same way anywhere else along the plane and cone will all be different. The two lines BB and AA are found to be respectively equal.

*The controlling cam.*

On the work shaft 11 (see Figs. 3 and 5) there is a cam 52 having, ordinarily, a single projection arranged to operate an oscillating yoke 53 having two opposite projections 54 for engaging the opposite sides of the cam surface, and fixed on a shaft 55 parallel with the shaft 11. At the other end this shaft is provided with a gear segment 56 which meshes with a rack 57. This rack is mounted on a bar 58 which slides in a groove 59 in a cam bar slide 60 mounted on ways on the saddle 26. These ways are parallel with the groove 59.

At the other end of the rack bar 58 is another rack 61 with which meshes a gear or pinion 62. (See Fig. 25). This gear is of annular form mounted to turn freely in a circular groove on the hub of a hand wheel 63. In the hub of this wheel is a space for a spacing ratchet pawl 64 which is pivoted so as to be capable of moving to three different positions, one of them neutral and the others for operation in opposite directions. This pawl has a V-shaped end adapted to rest on a steel plate 65 which is pressed forward by a spring 66. Through the pawl extends a rod 67 to which the pawl is fixed. This rod extends out to the front of the hand wheel where it is provided with a stud 68 by which it can be turned to turn the pawl to neutral or either forward or backward position as indicated in Figs. 28 and 29.

It will be understood that the operation of the rack bar 58 results in oscillating the wheel 62 regularly. This can be transmitted to the hand wheel to turn the same by a step-by-step movement in either direction according to the position of the pawl as will be obvious, or the pawl can be thrown out of operation as shown in Fig. 28.

*Cam bar operating connections.*

The hand wheel 63 and its hub are, of course, in one piece and this is mounted to be capable of free rotation on a screw shaft 70 supported in bearings 69 on the cam bar slide 60. At the end of this shaft there is a reduced neck on which is located a collar 71. This collar has pins 72 adapted to project into depressions 73 in the hub of the wheel 63. This collar is keyed to the shaft. Therefore when the collar is placed in the position shown in Fig. 25 and tightened up with the nut 74 the shaft 70 is fixed to the hand wheel and will be positively rotated thereby either by hand or by power. However, when the collar is taken off and turned around and put in the position shown in Fig. 26, the shaft 70 is rendered inoperative. In order to prevent accidental rotation of this shaft when inoperative a friction plate 75 (Fig. 3) is placed in contact with it and held yieldingly against it by a spring 76, the force of which can be adjusted by a bolt 77.

From what has been stated it will be understood that when the parts are in the position shown in Figs. 25 and 29 the reciprocation of the rack 58 will result in the intermittent rotation of the shaft 70. This shaft is provided on the end with a cam bar adjusting screw 79. This operates in a nut 80 and causes the nut to move by an intermittent motion along the screw as the machine is operated. This nut is provided with a radial stud 81 projecting down into a bushing 82 in a cam bar 83. This cam bar slides on the surface of the cam bar slide 60 and these parts are adapted to move from a position at the right hand end of the screw 79, as shown in Fig. 25, to the extreme position illustrated in that figure. This cam bar 83 is really a swinging lever which has an arcuate seat at its opposite end in a plate 84 (Fig. 22) also mounted on the cam bar slide 60. The end of the lever or cam bar is curved in the same way, the curve being drawn on the center of the stud 81 as a center. This cam bar 83 moves from a position at a considerable angle to that shown in Fig. 22 into its limiting position as shown in that figure when the nut 80 moves along the screw 79 to the position shown in Fig. 25. The object of this motion is to move a cam bar yoke 86. This yoke is provided with a passage therein for the cam bar and with a spacing piece 87 secured in position by a screw 88 to insure good feed. This yoke is also provided at a central point with a hub which projects upwardly therein and forms a circular bearing 89 for a vertical adjustment slide 90. A plate 91 is secured on the top of this hub by a central screw 92 and the parts prevented from turning by a pin 93 or in any other desired way.

It will be obvious that the operation of the nut 80 by the shaft 70 results in the intermittent forward motion of the nut to the limiting position shown in Figs. 3, 22 and 25 and that while this nut is moving to that limiting position the vertical adjustment slide 90 moves inwardly to the left in Fig. 24. The effect of this will be described later but first I will mention the adjustment of the cam bar slide 60. This is provided with a nut 95 extending down below it and secured to it in any desired way and through this passes an adjusting screw 96 having a head 97 by which it can be turned to move the cam bar slide forward and back for the purpose of registering it properly with the main slide 50 which has a metal piece 98 (see Fig. 6) set into it having a mark on it to register with a corresponding mark on the cam bar slide so that when the main slide has been set the cam bar slide is set to register exactly with it. This is necessary because the vertical adjustment slide is supported on the main slide 50 and the parts that operate the vertical adjustment slide are carried by the cam bar slide as stated. This cam bar slide also has a bracket 99 extending over the nut 80 through which passes the cam bar adjusting screw 79 for guiding the same. A binding screw 96$^a$ is shown for the cam bar slide 60 to the saddle 26.

*Vertical adjustment slide.*

The main slide 50 is provided with four parallel inclines 100. The bottom of the vertical adjustment slide 90 also has four inclined surfaces resting thereon. Consequently when the cam bar is swung inwardly toward the main slide and the cam bar yoke 86 moves in the same direction and forces the vertical adjustment slide inwardly the latter will drop in the form shown. Of course, it will be obvious that this is a mere means of changing the elevation and can be done for the purpose of dropping the tool or raising it. The conditions existing, that is, the shape of the teeth of the cutter being backed off, control this change in elevation. It will be obvious further that this change in elevation is progressive. Each time the main shaft rotates a complete revolution the cam 52 turns the screw shaft 70 through a part of a revolution and always in the same direction, and then this screw shaft stops until the next revolution of the main shaft. Therefore each time the main shaft rotates the parts supported by the vertical adjustment slide are lowered slightly, and an equal amount each time because the inclined surfaces are flat and parallel. If an irregular drop wire were desired these surfaces could be shaped for that purpose. This results in bringing these parts from their original position eventually to a position considerably lower, the purpose of which will be explained hereinafter.

*Swivel slides.*

On the vertical adjustment slide 90 there is located a lower swivel slide 101. This is swiveled to the vertical adjustment slide by a stud 102 screwed into the latter and centrally located with respect to both. The lower swivel slide 101 is provided with ways 103 on which is adapted to slide the upper swivel slide 104. To this slide is swiveled a guide plate 105 by a swivel stud 106 in central alignment with the stud 102.

The vertical adjustment slide 90 is provided with a series of arcuate concentric undercut slots 108, four being shown. These are for the purpose of receiving the heads of a series of bolts 109 which extend up through threaded holes 110 in the lower swivel slide 101. This slide is adapted to be turned on its central axis when these bolts are loosened and then the nuts on the bolts are tightened up to hold it in its adjusted position on the vertical adjustment slide. In like manner the upper swivel slide 104 is provided with similar curved undercut slots 111 for a series of bolts 112 which are fixed in a similar manner to the guide plate. These slots 111 are located in ears 113 projecting from the upper swivel slide and are shown as four in number. Thus the guide plate is adjusted with respect to the upper swivel slide and held in adjusted position.

For the purpose of adjusting the lower swivel slide accurately to position it is provided with a curved rack 115 and a worm 116 is mounted in a casing 117 fixed on the vertical adjustment slide 90. This worm has a hand wheel 118 for operating it and is located on the front in a convenient position. The lower swivel slide has a plate 119 having a center point on it and the vertical adjustment slide 90 has a curved scale 120 by which the operator can set these parts in such manner as may be desired.

The guide plate 105 extends down at the front of the machine and is provided with a vertical slot 121 in its end. In this slot fits a vertical guide 122 on the main slide 50. A similar guide is arranged at the rear and this constitutes a means for preventing side motion of the guide plate and consequently of the parts carried thereby in spite of the angular arrangement above indicated.

*Tool support.*

The guide 122 (see Figs. 3 and 4) is provided with an arm 123 having a stud 124 thereon arranged with a spring 125 to yieldingly press against the tool holder. This is for the purpose of steadying the tool holder with respect to the main slide and preventing its moving back on account of any wear or looseness of fit.

On the guide plate 105 is located a tool box 127 which carries the contour form tool 128 and constitutes a part of the tool block 129. Any usual form of binding screws 126 are employed for holding the tool in this tool holder.

*Operation.*

It will be understood from the description so far given that the tool which is supported indirectly by the saddle 26 is caused to move by the cam 20 in what I may refer to as the old or usual way. This motion is a gradual increasing motion inward to cut further in as the cutter turns with its shaft, and the cam 20 is so designed obviously as to cause this cut to be the regular backing off cut and leave the back of the tooth in proper shape so that as it is sharpened it may maintain its contour. Then the tool is drawn back ready to be moved in by the same cam when the next tooth comes around. This cam has to be located on a shaft as 16 which is timed to rotate as many times for each rotation of the main work-shaft 11 as there are teeth on the cutter which is being relieved.

It will be understood also from what has been said that I have now added a series of modifications of this movement controlled by the cam 52. (See Fig. 33). This cam is mounted directly on the main work shaft 11 or at any rate it rotates in synchronism therewith so that the cam rotates a complete revolution with that shaft. Therefore when this shaft is rotated once and one cut has been made the cam 52 acts and moves the rack 58 along and then back again. This feeds the screw shaft 79 a definite number of rotations or a definite proportion of a rotation for each reciprocation of the rack. This feeds the nut 80 a definite amount and therefore feeds the vertical adjustment slide 90 forward a definite amount for each rotation of the shaft 11. Therefore this adjustment slide changes the elevation of the cutting tool an equal amount every time the cutter rotates a complete revolution. Also the angular relationship between the upper and lower swivel slides, due to their adjustment around the center, changes the position of the cutting tool toward the work at the same time. The amount of change is regulated by the adjustment of these slides angularly. But there is no angular adjustment of the tool itself because the guide 122 and guide plate 105 prevent it. It will be seen, therefore, that this mechanism as so far described could be used with any form of device for feeding the form tool 128 forward along the cutter after each revolution is completed and that each time it is fed forward the position of the tool is altered both horizontally and vertically to compensate for the necessary change in the shape of the relief curve on the back of the tooth. This change is progressive all the way across and the feed is constant as shown.

*Tool rocking device.*

Although in the last two sheets of the drawings I have shown an arrangement for feeding the tool along the work by a step by step motion suitable for this class of machines I prefer to use a rocking motion for the tool and for that purpose the mechanism shown in Figs. 17 and 18 is provided.

Keyed to the hub of the hand wheel 63 is a gear 130. This gear drives a gear 131 mounted on an arm 137 pivoted about a neck on one of the bearings 69 on the center of a shaft 133. The gear 131 drives a gear 135 on a shaft 133. This gear 135 is keyed to a bushing 136 which is itself keyed to that shaft. The shaft 133 is supported by a yoke 138 and has an arm 132 provided with a longitudinal slot 134 for receiving a stud bolt 1310 on which the gear 131 is revolubly carried. Therefore the gear 131 can be adjusted along the slot to provide for changing the gear to provide the desired ratio.

The yoke or extension 138 is located on the guide plate 105. The shaft 133 is also provided with a screw thread 139 which co-operates with a nut 140 fixed to the end of a radius bar 141. It will be understood that this shaft 133 with its screw 139 is rotated by an intermittent motion exactly like the motion of the screw 79. The result therefore is that the radius bar moves forward gradually making a slight motion every time the shaft 11 completes a revolution. The extent of this motion is controlled by the size of the gear 131 that is used. This radius bar rests on top of the guide plate 105 and it is received in a guide slot 142 in the bottom of the tool support 127 as indicated in Fig. 20. This slot and the radius bar are both curved on a long radius. For example, in one design of the machine this radius is sixteen feet and it is designed to move the tool holder in the same way as if the tool holder were mounted on the circumference of a wheel thirty-two feet in diameter and the said wheel rolled on a flat surface. This is the object of the radius bar and the slot 142 in which it is located in the tool support.

It will be understood that the mere movement of the radius bar on a straight path with the tool holder fitting it and swinging with it would not accurately restrain the tool holder to move exactly in the manner desired unless some sort of a guide were provided. For this purpose I provide a straight rack consisting of two teeth 143 fixed on the guide 105. These two teeth are formed like the teeth of a straight rack and between them is located another tooth 144, on the tool support 127, which is formed and has its outline just as it would have if it were a part of a gear tooth on a thirty-two foot wheel meshing with the rack 143 to restrain the tool holder to move with the rocking motion just described. This gear tooth 144 is provided with pins 145 extending down from the tool support 127 and holding it in fixed position with respect to the tool holder. This insures a perfect rolling motion of the tool holder. I have shown a gib 146 held by a screw 147 in front of the radius bar for engaging and holding it and giving it the proper slant to agree with that of the tool.

*Rocking operation.*

The contour form tool 128 is made with a wide face, a face as wide as the cutter being operated on is long, and it has the same contour as the cutter except that this contour is modified as will appear from a comparison of Figs. 37 and 38. If this form tool were to cut a straight line on the cutter it would not be made with a straight cutting face but that face would be modified to the extent of rounding it on an arc of the same circle that has been mentioned, that is, a circle having a thirty-two foot diameter. The form tool of course will not ordinarily ever be used for cutting a straight cut all the way across but it is given the necessary contour to shape the ends of the teeth of the cutter in the proper manner and this contour is modified by curving it in the same way. As the curvature on a 16 foot radius could not be distinguished readily on drawings of this scale I have exaggerated it in Fig. 38, modifying the normal contour shown in Fig. 37, by drawing it on a one foot radius in Fig. 38. This shows that the lines that otherwise would be straight are curved.

The manner of shaping this form tool is indicated in Fig. 39. A master tool 148 is accurately formed by accurate hand and tool work having a single cutting edge having the exact contour of one of the teeth of the cutter C to be made. This is hardened and fixed firmly in stationary position. A single toothed form tool 128 is mounted to swing slowly on a sixteen foot radius in the plane of the master tool and caused to have a reciprocation transverse to its plane repeatedly as it swings slowly from the full line to the dotted line position shown in Fig. 39. The reciprocating motion results in shaping the form tool by the master tool to the proper shape. Its shape is the negative of the tooth of the cuter C modified by the swinging motion. Both of these tools have the necessary slant on top due to the slanting position of the teeth of the cutter C. The manufacture of the form tool by the master tool is performed on another machine not shown. The form tool 128 is arranged, for example, with its right hand end engaging the right hand end of the cutter C when the operation starts as indicated in full lines in Fig. 44. Its upper surface is inclined and its edge is located at an angle to correspond with the slant of the cutter teeth as indicated by the line c in Fig. 34. All of the tool at the left of the cutting point is curved away from the cutter but on such a gradual curve that the previously blanked out cutter will be engaged and cut by a portion at least of this surface but this is only a roughing cut. The finishing cut is being taken during the first revolution at the extreme right hand end of the form tool in the form shown. When that revolution is completed the cam 52 operates and the tool is rolled along a slight distance so that during the next revolution a point at a slight distance, say one-hundredth of an inch, from the end of the cutting tool is taking its finishing cut and the rest of the tool at the left is taking another deeper roughing cut but these parts at the left can never at this time cut to the full depth. At the same time the tool at its extreme end has moved away from the cutter and no longer comes into contact with it. This action is progressive throughout the operation of backing-off the previously formed cutter C. It will be understood from what has been said also that the tool is moved to change its elevation and to change its position on the saddle each time a complete revolution is completed. The single cam 52 is designed to accomplish all these results modified by the adjustments which have been described so that when properly adjusted this single cam not only rolls the tool 128 along the work C but changes its elevation and its distance from the axis of the work. These corrections are made for the purpose of compensating for the fact that the backing-off curve X (Fig. 36) on the tooth is lengthening all the time from one end of this specific cutter to the other and by the fact that it is moving inwardly toward the center farther all the way as we progress across the cutter. It will be understood further that this form tool 128 is not set with its upper edge parallel to the axis of the work but parallel to the front face of the cutting tooth. That is, it is arranged at an angle tangent to an imaginary cone.

The operation of backing-off a cutter tooth is indicated in Fig. 44, showing the progress of the cutting tool inwardly along the cutter. It starts in the full line position and finishes in the dotted position.

It will be seen, therefore, that I use the old cam 20 for its usual purpose and modify its action in three ways, all controlled by the cam 52. In this way all the results outlined in the preamble are obtained positively and accurately.

Single point tool.

Figure 33:
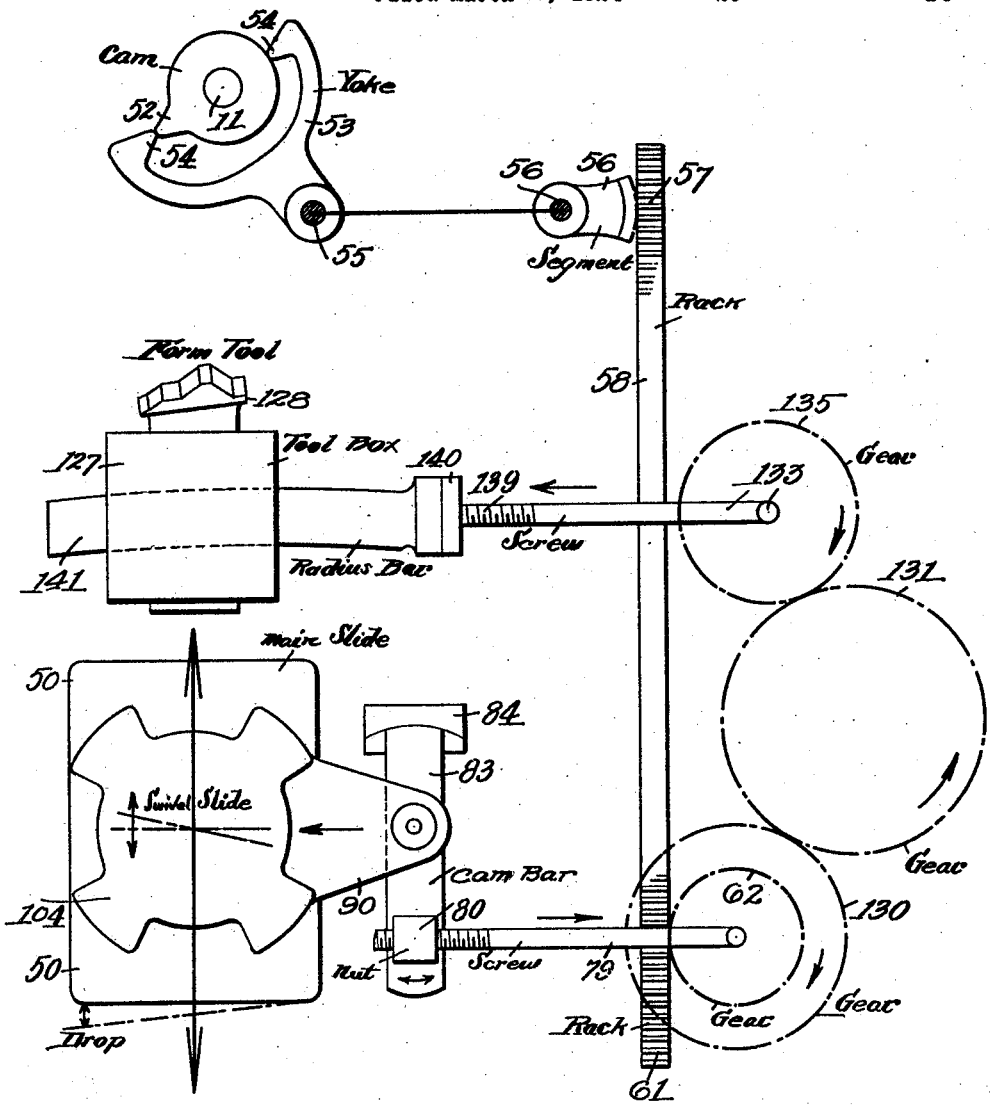
Fig. 33 is a diagrammatic view of the various parts of this machine showing their cooperation.

Although I have so far described the invention as involving a rocking or rolling tool, the invention is capable of use with a single point tool fed along the work. For the purpose of showing how the invention can be carried out in that way I have illustrated a means of doing it on the last two sheets of drawings. Comparing these drawings with Fig. 33, it is to be understood that the mechanism shown in the last two sheets is to be used in connection with the cam 52, rack 58, gears 62 and 135 and associated or intermediate parts. The gear 62 operates a screw 79 and a vertical adjustment slide 90, as well as the two swivel slides just as shown in Fig. 33. The power is transmitted to the shaft 133 through the gear 135 in the same way as above described and on this shaft 133 is a screw 139 as before. It will also be seen that the mechanism shown in these two figures is mounted on the upper swivel slide 104 and several other features shown above are also shown here, including the gib 146 and its adjusting screw 147.

But now referring to these two sheets in question, it will be seen that on the upper swivel slide 104 is supported the guide plate 105 which carries a tool box 127ª. Through a straight transverse passage in the tool box extends a slide 150 guided in a straight passage in the plate 105. This slide has a screw threaded nut fixed in the end into which the screw 139 extends and by which this slide is moved. This slide is provided with steel shoes 151 on both sides for receiving between them a pair of cylindrical projections 152 extending down from the bottom of the tool holder or box 127ª. This tool box is mounted in a slightly inclined position on the tool holder on ways 153 adjustable to any angular position by a screw 154 and nut to hold the tool 155 in the desired angular position to correspond with the angle of the edge of the tooth of the cutter to be backed off. The cylindrical projections 152 are made in that shape to accommodate any rocking of the tool holder by these pivoted holder ways.

The feeding forward of the slide 150 therefore necessarily carries with it the tool holder 127ª and this is provided with a tool holder bar 156 extending rearwardly and carrying the cutting tool 155. The bar 156 has fixed to it a follower 157. This follower is pressed up in a way to be described against a former 158 fixed on the guide plate 105. This former has the exact contour of the cutter tooth to be backed off.

For the purpose of pressing the follower up against the former so that it will always rest against the surface of it and cause the tool 155 to go just far enough into the work to produce the desired shape, the bar 156 is provided with a vertical roll 159. Against this presses a plate 160 mounted to swing on two parallel links 161 and having equal lengths between their pivots. These links are pivoted at their ends on brackets 162 carried by the plate 105. Therefore the plate 160 has a parallel motion and can be caused to press against the roller 159 in a uniform manner following it up to exert equal pressure on it at all times. At the front on a bracket 169 is a shaft 163 having two central arms 164 keyed thereon. These arms carry a cross pin 170 in slots in the arms. On this pin is a block 171 secured by a screw to the rear of the plate 160. This shaft also has two forwardly extending arms 165 at its ends. They are connected by cords or belts 166 passing over supporting pulleys 168 with a pair of counterweights 167. These weights pull up on the arms 165 and swing the arms 164 over inwardly to constantly tend to push in the plate 160. This acts against the roller 159 to hold the follower 157 against the former 158 at all times. The plate 160 rests and slides on the flat tops of two supports 172 on the bracket 169 and one bracket 162 respectively.

As the slide 150 is forced along it takes the tool with it across the machine and provides the feed but the follower and associated parts keep the tool at the right distance from the axis of the cutter being operated upon and force the tool to cut a shape on the cutter exactly like the outline of the former. In this way the results described above in connection with the first forty-four figures can be obtained with a single point tool and without greatly altering the mechanism of the machine.

It will be seen in either case that this milling cutter has a non-spiral cutting-tooth of a formation comprising a plane tooth face which is positioned to coincide with a geometric-plane that is tangential to an axial-cone, and which intersects in a variably-curved elliptic arc $d$ or $d'$ a cylindrical cutter-enclosing and non-contoured rotor-form that is circular in section and concentric with the cutter-axis, and which cutting-tooth, (in any contoured form thereof) has a cutting edge located with its profile throughout the length thereof in said tangential plane, and also has said plane face rotatively retraceable (with said geometric-plane and around the cutter axis) by the grinding away of said plane-face in maintaining the cutting edge. Said cutting-tooth is proportioned and adapted for shaping to differing cutter-contours including a maximum contour coinciding with an axial-plane surface-line of said rotor form, and has a relieving surface extending backwardly and inwardly from the cutting edge profile thereof. This relief-surface has comprised therein relief-lines located each in a plane of rotation and each extending backwardly and receding inwardly as a point-path of and from a point in the cutting edge. Said point-path relief-lines have, during a rotative-retraction of the face-plane through any given arc, recessional movement all of them along non-radial and parallel lines but by varying distances, respectively, in the geometric face-plane surface. At the same time all approach toward the cutter-axis each by the same distance, and thereby form in a more retracted face-plane position a newly-located cutting-edge having a profile differing from the profile thereof in a preceding face-plane position, but having (in this newly-located cutting edge) each of said points thereof receded toward the cutter-axis by the same radial distance as all the others of said points. Thus the cutting-edge on being thus newly-located in any such more retracted face-plane position is thereby revised in profile and newly positioned for producing (on the rotating of the cutter) a precisionized milled-surface having (in a radial-to-axis plane that is perpendicular to this milled surface) the same sectional form as was produced by the cutting-edge when this edge was in a face-plane less retracted in rotative position. Also said cutting-edge in each of said successive positions thereof and when also having the said maximum contour, has the edge-profile thereof located in and coinciding with an elliptic arc which is the line of intersection of said face-plane with the said geometric rotor-form, said cutting-edge being thereby progressively reshaped at said successive positions thereof into elliptic arcs of successively increased curvatures respectively, and thereby continuously positioned and adapted throughout the described rotative-retractions thereof, for milling an accurately-formed plane surface.

Although I have illustrated and described only two forms of the invention, I am aware of the fact that modifications can be made therein by any person skilled in the art without departing from the scope of the invention as expressed in the claims. Therefore I do not wish to be limited to all the details of construction herein shown and described but what I claim is:—

1. In a backing-off attachment, the combination of a slide and means for reciprocating the slide to cause a tool rigidly carried thereby to cut a proper backing-off surface on the end of a tooth on a cutter due to the motion of the slide, with a tool holder supported on the slide, means for changing the elevation of the tool holder on the slide and at the same time shifting the tool holder in the direction of reciprocation of the slide so as to change the position of the tool longitudinally as well as vertically on the slide.

2. The combination with a backing-off device comprising a main slide and means for reciprocating said main slide at such a varying speed as to cause a tool carried by the main slide to accurately back off the tooth of the cutter, said main slide having inclined ways, of a vertical adjustment slide having corresponding inclined ways resting on the first named ways, means for intermittently moving the vertical adjustment slide on said ways, whereby the last named slide will be caused to change its elevation, a swivel slide swiveled to said vertical adjustment slide and having ways, a second swivel slide slidable on the last named ways, and means for supporting a backing-off tool carried by the second swivel slide.

3. The combination of a backing-off device comprising a main slide and means for reciprocating said main slide, of a vertical slide on the main slide, a lower swivel slide swiveled to the top of said vertical adjustment slide and having ways on its upper surface, an upper swivel slide slidable on the last named ways, and means for supporting a backing-off tool swiveled to the upper swivel slide, whereby the two swivel slides can be set in such a way that the position of the tool holder in a horizontal direction will be changed.

4. The combination with a backing-off device comprising a main slide and means for reciprocating said main slide to cause a tool carried by the main slide to accurately back off the tooth of a cutter, of a lower swivel slide having ways on its upper surface, an upper swivel slide slidable on the last named ways, a guide plate pivotally connected with the upper swivel slide on the axis of the lower swivel, and a tool holder carried by the guide plate, whereby when the swivel slides are set at an angle to a line transverse to the direction of motion of the main slide they will advance or retard the tool in that direction.

5. The combination of a backing-off device comprising a main slide having a set of inclined ways and means for reciprocating said main slide, of a vertical adjustment slide on the main slide having corresponding inclined ways resting on the first named ways, means for automatically moving the vertical adjustment slide on said ways, whereby the last named slide will be caused to change its elevation, a lower swivel slide swiveled to the top of said vertical adjustment slide and having ways on its upper surface, an upper swivel slide slidable on the last named ways, and means for supporting a backing-off tool swiveled to the upper swivel slide, whereby the two swivel slides can be set in such a way that when the elevation of the vertical adjustment slide is changed the position of the tool holder in a horizontal direction will also be changed.

6. The combination with a backing-off device comprising a main slide and means for reciprocating said main slide at such a varying speed as to cause a tool carried by the main slide to accurately back off the tooth of a cutter, of a set of inclined ways on the main slide, a vertical adjustment slide having corresponding inclined ways resting on the first named ways, means for moving the vertical adjustment slide on said ways, whereby the last named slide will be caused to change its elevation, a lower swivel slide swiveled to the top of said vertical adjustment slide and having ways on its upper surface, an upper swivel slide slidable on the last named ways, means for supporting a backing-off tool from the upper swivel slide, and calibrated means for adjusting said swivel slides together about their centers, whereby a change in the elevation of the vertical adjustment slide will change the horizontal position of the tool supporting means carried indirectly by the upper swivel slide.

7. The combination with a backing-off device comprising a main slide and means for reciprocating said main slide at such a varying speed as to cause a tool carried by the main slide to accurately back off the tooth of a cutter, of a vertical adjustment slide, means for moving the vertical adjustment slide to cause it to change its elevation, a lower swivel slide swiveled to the top of said vertical adjustment slide and having ways on its upper surface, an upper swivel slide slidable on the last named ways, a guide plate pivotally connected with the upper swivel slide on the axis of the lower swivel slide, and a tool holder carried by the guide plate, whereby when the swivel slides are set at an angle to a line transverse to the direction of motion of the main slide they will advance or retard the tool in that direction.

8. The combination with a backing-off device comprising a main slide and means for reciprocating said main slide at such a varying speed as to cause a tool carried by the main slide to back off the tooth of a cutter, of a vertical adjustment slide, inclined ways between the two slides, means for moving the vertical adjustment slide longitudinally of said ways, whereby the last named slide will be caused to change its elevation, and means supported on the last named slide for holding a backing-off tool.

9. The combination with a backing-off device comprising a main slide and means for reciprocating said main slide, of a vertical adjustment slide movable up or down progressively, a lower swivel slide swiveled to the top of said vertical adjustment slide and having ways on its upper surface, an upper swivel slide slidable on the last named ways, a guide plate pivotally connected with the upper swivel slide on the axis of the lower swivel slide, and a tool holder carried by the guide plate, whereby when the swivel slides are set at an angle to a line transverse to the direction of motion of the main slide they will advance or retard the tool in that direction progressively, and a guide for preventing any sideways motion of the tool holder.

10. The combination with a backing-off device comprising a main slide and means for reciprocating said main slide to back off the tooth of a cutter, a vertical adjustment slide on the main slide, means for moving the vertical adjustment slide to change its elevation, a lower swivel slide swiveled to the top of said vertical adjustment slide and having ways on its upper surface, an upper swivel slide slidable on the last named ways, a guide plate for supporting a backing-off tool swiveled to the upper swivel slide, means for fixing the lower swivel slide in its adjusted relation to the vertical adjustment slide, and means for fixing the guide plate in its adjusted position with relation to the upper swivel slide.

11. The combination with a backing-off attachment comprising a main slide, means for reciprocating said main slide in such a way as to cause a tool fixed on the main slide to cut an accurate backing-off curve on the end of the tooth of a cutter, and a main shaft on which the cutter to be backed off is mounted, of a cam mounted to rotate synchronously with said main shaft, a tool holder movably supported on said main slide, and means operated by said cam for altering the position of said tool holder on the main slide upon each complete rotation of the cam.

12. The combination with a backing-off attachment comprising a main slide, means for reciprocating said main slide to cause a tool fixed on the main slide to cut a backing-off curve on a tooth, and a main shaft on which the cutter to be backed off is mounted, of a cam mounted to rotate synchronously with said main shaft, a tool holder movably supported on said main slide, a reciprocable rack, connections from the cam for reciprocating said rack, a gear meshing constantly with said rack, a hub extending into the gear, means for connecting said hub with the gear to cause the hub to be rotated in one direction but not in the other by the gear or to be thrown out of connection therewith, and means connected with said hub for operating the tool holder.

13. The combination with a turning attachment comprising a main slide, means for reciprocating said main slide, and a main shaft on which the work is mounted, of a cam mounted to rotate synchronously with said main shaft, a tool holder movably supported on said main slide, a reciprocable rack, connections from the cam for reciprocating said rack, a gear meshing constantly with said rack, a shaft having connections for operating the tool holder, detachable means for connecting said shaft with the gear to cause the shaft to be rotated in one direction but not in the other by the gear or to be thrown out of connection therewith, whereby said shaft will be turned intermittently and in one direction as the rack reciprocates when the detachable means is in place.

14. The combination with a turning attachment comprising a reciprocable main slide having a tool holder movable thereon, and a main shaft on which the work is mounted, of a cam mounted to rotate synchronously with said main shaft, a tool holder movable supported on said main slide, a shaft for moving the tool holder on the main slide, detachable means for connecting said shaft with the cam to cause the shaft to be rotated in one direction but not in the other by the cam or to be thrown out of connection therewith, whereby said shaft will be turned intermittently and in one direction as the cam rotates when the detachable means is in place, the detachable means also being reversible to a position in which it prevents positive connection of the cam with the shaft, and frictional means for preventing the accidental rotation of the shaft when the connecting means is reversed.

15. The combination with a turning attachment comprising a reciprocable main slide, and a main shaft on which the work is mounted, of a cam mounted to rotate synchronously with said main shaft, a tool holder movably supported by said main slide, a shaft, means for connecting said cam with the shaft to cause the shaft to be rotated in one direction but not in the other by the cam or to be thrown out of connection therewith, a screw on said shaft, a nut operated by the screw, a cam bar movable by the nut as it is fed along the screw intermittently, and means operated by the cam bar for changing the position of the tool holder on the main slide.

16. The combination with a turning attachment comprising a reciprocable main slide, and a main shaft on which the work is mounted, of a cam mounted to rotate synchronously with said main shaft, a screw shaft, means connected with said cam for turning said shaft always in the same direction intermittently, a nut movable along the threads on the screw shaft, a pivoted cam bar to which the nut is pivoted, a yoke connected with said cam bar to be moved therewith, a vertical adjustment slide connected with said yoke, a tool holder supported by said vertical adjustment slide, and means connecting the vertical adjustment slide and the main slide for varying the elevation of the vertical adjustment slide on the main slide as its position relative thereto is altered by the operation of the cam bar.

17. The combination with a backing-off device comprising a main slide and means for reciprocating said main slide, a vertical adjustment slide having inclined ways resting on the main slide, means for moving the vertical adjustment slide on said ways, whereby the last named slide will be caused to change its elevation, a guide plate, means for supporting the guide plate on the vertical adjustment slide, means on the guide plate for holding a backing-off tool, and means for adjusting the supporting means in such a way as to cause the guide plate to be moved longitudinally, when the vertical adjustment slide is moved vertically.

18. The combination with a turning device comprising a main slide and means for reciprocating it, of a vertical adjustment slide having inclined ways resting on the first named ways, means for moving the vertical adjustment slide on said ways, whereby the last named slide will be caused to change its elevation, a guide plate, means for supporting the guide plate on the vertical adjustment slide, means for adjusting the supporting means in such a way as to cause the guide plate to be moved longitudinally when the vertical adjustment slide is moved vertically, a tool holder on the guide plate, and means for giving the tool holder a motion equivalent to that of rolling it on a straight line.

19. The combination with a turning device comprising a main slide, and means for reciprocating it, the slide having a set of inclined ways, of a vertical adjustment slide resting on the ways, means for moving the vertical adjustment slide on said ways, whereby the last named slide will be caused to change its elevation, means for movably supporting a tool holder on the vertical adjustment slide, means for adjusting the supporting means in such a way as to cause the tool holder to be moved longitudinally when the vertical adjustment slide is moved vertically, and means for giving the tool holder a motion equivalent to that of rolling it on a straight line as a part of an imaginary wheel having a large diameter.

20. The combination in a device comprising means for reciprocating a main slide, of a vertical adjustment slide, means for moving the vertical adjustment slide up or down, a tool carrier supported on the last named slide, means for adjusting the supporting means in such a way as to cause the tool carrier to be moved longitudinally when the vertical adjustment slide is moved vertically, a contour cutting tool mounted on said tool carrier and having a cutting edge curved on a large radius but otherwise conforming to the contour to be cut, and means for rolling said tool on its curved outline intermittently while it is cutting.

21. The combination with a backing-off device comprising a main slide and means for reciprocating it, of a cam, a vertical adjustment slide having means by which it will be caused to move by said cam and change its elevation, means supported on the last named slide for holding a backing off tool, means for adjusting the tool holding means in such a way as to cause the tool holding means to be moved longitudinally when the vertical adjustment slide is moved vertically, a contour cutting tool mounted on said tool holding means and having a cutting edge curved on a large radius but otherwise conforming to the contour to be cut, means for rolling said tool on its curved outline intermittently while it is cutting, and means for causing this rolling action to be connected with and operated by said cam.

22. The combination with a backing-off device comprising a main slide and means for reciprocating it to accurately back off the tooth of a cutter, of a tool holder supported by the slide, a cam for operating the tool holder, means for adjusting the supporting means in such a way as to cause the tool holder to be moved longitudinally thereon when the slide is moved, a contour cutting tool mounted on said tool holder and having a cutting edge curved on a large radius but otherwise conforming to the contour to be cut, means for rolling said tool on its curved outline intermittently while it is cutting, and means operated by said cam for accomplishing the rolling action of the cutting tool.

23. The combination with a turning device comprising a main slide and means for reciprocating it, of a cam, a vertical adjustment slide having means by which it will be caused to move by said cam and change its elevation, means supported on the last named slide for holding a tool, a contour cutting tool mounted on said tool holding means and having a cutting edge curved on a large radius but otherwise conforming to the contour to be cut, means for rolling said tool on its curved outline intermittently while it is cutting, and means for causing this rolling action to be connected with and operated by said cam.

24. The combination with a turning device comprising a main slide and means for reciprocating it, of a tool holder supported by the slide, a cam for operating the tool holder, a contour cutting tool mounted on said holder, means for rolling said tool intermittently, while it is cutting, and means operated by said cam for accomplishing the rolling action of the cutting tool.

25. The combination with a turning device comprising a main slide and means for reciprocating it, of a cam, means supported on the slide for holding a tool, means for adjusting the tool holding means in such a way as to cause the tool holding means to be moved longitudinally when the vertical adjustment slide is moved vertically, a contour cutting tool mounted on said tool holding means and having a cutting edge curved on a large radius but otherwise conforming to the contour to be cut, means for rolling said tool on its curved outline intermittently while it is cutting, and means for causing this rolling action to be connected with and operated by said cam.

26. The combination with a backing-off attachment comprising a reciprocable slide, and means for reciprocating said slide in such a way as to cause a tool fixed thereon to cut a true backing-off curve on a cutter tooth, of a tool holder movably supported by said slide and having a curved guide therein, the curve being drawn on a long radius, a radius bar fitting in said curved guide and of the same shape, and means for advancing said radius bar intermittently for rocking the tool holder in a plane.

27. The combination with a turning attachment having a slide and means for moving said slide back and forth in a predetermined ratio, of a tool holder supported by said slide but capable of rocking thereon in a plane parallel with the direction of motion of the slide, said tool holder having an arcuate guiding slot, a radius bar having a curvature the same as that of the slot, means for intermittently advancing said radius bar through the slot to rock the tool holder about the center on which the curve of the radius bar is drawn, and a cutting tool supported by the tool holder having a cutting edge provided with a contour similar to that to be cut on the work but curved on the radius on which the curve of said radius bar is drawn.

28. The combination with a backing-off attachment having a slide and means for moving said slide back and forth in a predetermined ratio, of a tool holder supported by said slide but capable of rocking thereon in a plane parallel with the direction of motion of the slide, said tool holder having an arcuate guiding slot, a radius bar having a curvature the same as that of the slot, means for intermittently advancing said radius bar through the slot to rock the tool holder about the center on which the opposite sides of the radius bar are drawn, a cutting tool supported by the tool holder having a cutting edge provided with a contour similar to that to be cut on the work but curved on the radius on which the sides of said radius bar are drawn, a main shaft on which the work to be relieved is mounted, a cam on the main shaft, means operated by the cam for moving the tool holder on the slide, a rack operated by the cam for moving the tool holder on the slide, a rack operated by the cam adapted to be reciprocated thereby once for each complete rotation of the main shaft, and gearing connected with said rack and with the radius bar for moving the radius bar.

29. The combination in a turning attachment of a slide and means for moving said slide back and forth, a tool holder supported by said slide but capable of rocking thereon in a plane, said tool holder having an arcuate guiding slot, a radius bar having a curvature the same as that of the slot, means for intermittently advancing said radius bar through the slot to rock the tool holder, a cutting tool supported by the tool holder having a cutting edge provided with a contour similar to that to be cut on the work but curved on the same radius as the radius bar, a main shaft on which the work is mounted, a cam on the main shaft, a rack operated by the cam adapted to be reciprocated thereby once for each complete rotation of the main shaft, gearing connected with the rack, a shaft having a gear thereon adapted to be driven intermittently by said gearing, a screw on the last named shaft, and a nut on the radius bar fitting the screw, whereby the radius bar is fed forward intermittently by the gearing.

30. The combination with a turning attachment having a slide and means for moving said slide back and forth in a predetermined ratio, of a tool holder supported by said slide but capable of rocking thereon in a plane, said tool holder having an arcuate guiding slot, a curved radius bar, means for intermittently advancing said radius bar through the slot to rock the tool holder about a center, a cutting tool supported by the tool holder having a cutting edge provided with a contour similar to that to be cut on the work but curved, a pair of stationary gear teeth supported by said main slide, and a gear tooth fixed with respect to the tool holder and located between the other two gear teeth and having a pitch equal to the diameter on which the curve of the radius bar is drawn and concentric therewith for restraining the motion of the tool holder to a true rocking motion on a flat surface.

31. In a machine for turning with a form tool, the combination with a tool holder or box for carrying the tool, a slide movable toward and from the work on which said box is carried, and means for moving the tool carried in such a manner as to give it a rolling motion along the work.

32. In a turning machine, the combination of means for supporting the work to rotate, a tool holder or box for carrying the tool, a contour form tool therein as long as the work, a slide movable toward and from the work on which said box is carried, means for changing the position of the box on the slide automatically as the slide moves, and means for moving the tool in such a manner as to give it a rolling motion along the work.

33. In a turning machine, the combination with a slide movable toward and from the work, a tool holder or box movably mounted on the slide, and a contour form tool mounted in said box, of means operated automatically from the slide moving mechanism for progressively rocking the tool along the work, whereby at the beginning of the cut one end of the tool will produce its finishing cut along the work and portions of the tool at one side thereof will be taking a roughing cut and whereby, as the tool rocks, the finishing cut will progress along the work from one end to the other.

34. The combination with a tool support and a contour form tool carried thereby adapted to operate along a rotating piece of work, of means for rolling said tool along the work in a progressive manner, while the work rotates at a relatively high speed, so as to cause the tool to cut its final cut first at one end and then at points intermediate the ends in a manner gradually progressing from one end of the work to the other, whereby at all times the part of the tool at one side of the point that is taking its finishing cut will be taking a roughing cut and the parts of the tool at the other side will have drawn away from contact with the finished surfaces of the work.

35. The method of making a form tool for backing-off a rotary cutter which consists in providing a master tool having an outline the same as the form to be produced on the cutter, mounting it in stationary position, providing a blank for a form tool of a corresponding outline, rolling or rocking it on a long radius along the edge of the master tool and causing a relative transverse motion between the master tool and form tool blank to shape the surface of the form tool blank while the latter is rocking along the master tool.

36. The method of making a rotary cutter which consists in providing a master tool having an outline the same as the form to be produced on the cutter, mounting it in stationary position, providing a blank for a form tool of a corresponding outline, rolling it on a long radius, causing a relative transverse motion between the master tool and form tool blank to shape the surface of the form tool blank while the latter is rolling along the master tool, mounting the rotary cutter blank on a stationary axis, placing the form tool in registration therewith, and mounting it to roll along the cutter on a radius equal to the radius on which the form tool rolled in producing it, and rotating the cutter while the form tool rolls along the same, whereby the shape of the cutter produced will be the same as the shape of the master tool.

37. The method of backing-off a rotary cutter which consists in providing a master tool having an outline the same as the form to be produced on the cutter, mounting it in stationary position, providing a blank for a form tool of a corresponding outline, rolling it on a long radius, causing a relative transverse motion between the master tool and form blank to shape the surface of the form tool blank while the latter is rolling along the master tool, mounting the rotary cutter blank on a stationary axis, placing the form tool in registration therewith and mounting it to roll along the cutter on a radius equal to the radius on which the form tool rolled in producing it, rotating the cutter while the form tool rolls along the same, and moving the form tool transversely during the cutting operation.

In testimony whereof I have hereunto affixed my signature.

FRANK O. HOAGLAND.